US006477181B1

(12) United States Patent
Fujimori et al.

(10) Patent No.: US 6,477,181 B1
(45) Date of Patent: Nov. 5, 2002

(54) DATA COMMUNICATION METHOD AND SYSTEM

(75) Inventors: Junichi Fujimori, Hamamatsu (JP); Yoshihiro Inagaki, Hamamatsu (JP); Hirotaka Kuribayashi, Hamamatsu (JP); Yasushi Ohtani, Hamamatsu (JP); Tatsutoshi Abe, Hamamatsu (JP)

(73) Assignee: Yamaha Corporation, Hamamatsu (JP)

( * ) Notice: Subject to any disclaimer, the term of this patent is extended or adjusted under 35 U.S.C. 154(b) by 0 days.

(21) Appl. No.: 09/194,520

(22) Filed: Nov. 5, 1998

(30) Foreign Application Priority Data

| May 7, 1996 | (JP) | 8-137623 |
| Jul. 12, 1996 | (JP) | 8-200988 |
| Jul. 12, 1996 | (JP) | 8-200989 |
| Dec. 20, 1996 | (JP) | 8-354655 |

(51) Int. Cl.[7] ............... H04J 3/00; H04J 3/06
(52) U.S. Cl. ................... 370/476; 370/503
(58) Field of Search .................. 370/351, 389, 370/400–403, 395, 395.6, 412, 470, 359, 402, 438, 489, 458, 463, 472, 474, 476, 503.4, 508.9, 512–14, 516.18

(56) References Cited

U.S. PATENT DOCUMENTS

| 5,204,857 A | * | 4/1993 | Obara ................. 370/354 |
| 5,359,600 A | * | 10/1994 | Ueda et al. ............ 370/399 |
| 5,541,926 A | * | 7/1996 | Saito et al. ............ 370/395.6 |
| 5,559,962 A | * | 9/1996 | Okamura et al. ........ 340/825.52 |
| 6,058,119 A | * | 5/2000 | Engbersen et al. ........ 370/466 |
| 6,324,179 B1 | * | 11/2001 | Doshi et al. ............ 370/395.4 |

FOREIGN PATENT DOCUMENTS

| EP | 0 485 971 | 5/1992 |
| EP | 703713 A2 | 3/1996 |
| GB | 2 177 877 | 1/1997 |
| JP | 60-2992 | 1/1985 |
| JP | 63-136859 | 6/1988 |
| JP | 63-301997 | 12/1988 |
| JP | 63306740 | 12/1988 |
| JP | HEI2-5660 | 1/1990 |
| JP | 3133233 | 6/1991 |
| JP | 5-37548 | 2/1993 |
| JP | 05 037560 | 2/1993 |
| JP | 6-30047 | 2/1994 |
| JP | 6-67658 | 3/1994 |
| JP | 06 177897 | 6/1994 |
| JP | 7-13560 | 1/1995 |
| JP | 07-059053 | 3/1995 |
| JP | 7-287572 | 10/1995 |
| JP | 7-336354 | 12/1995 |
| JP | 8-6551 | 1/1996 |
| JP | 08-214296 | 8/1996 |

OTHER PUBLICATIONS

Real–time Midi data flow on Ethernet and the software architecture of MidShare, Game Research Laboratory, Proceedings of the International Computer Music Conference, 1994.
A Bus on a Diet—The Serial Bus Alternative, Michael Teener, Apple Computer, Inc., 1992.

* cited by examiner

*Primary Examiner*—David Vincent
(74) *Attorney, Agent, or Firm*—Morrison & Foerster LLP

(57) ABSTRACT

In transmitting a plurality of data arranged in a time series of a first period (T), there is formed, every predetermined second period (SF) longer than the first period (T), a packet containing a plural number (x) of data supplied within a given cycle of the second period (SF). At that time, one data is specified from among every group consisting of a fixed number (M), not smaller than two, of the data, and time information indicative of a time position of the specified data is attached to the packet which the data belong to. A receiving-end unit reproduces the data, by reproducing the respective time positions, i.e., the first period (T), of the individual data on the basis of the time information contained in the received packet.

36 Claims, 18 Drawing Sheets

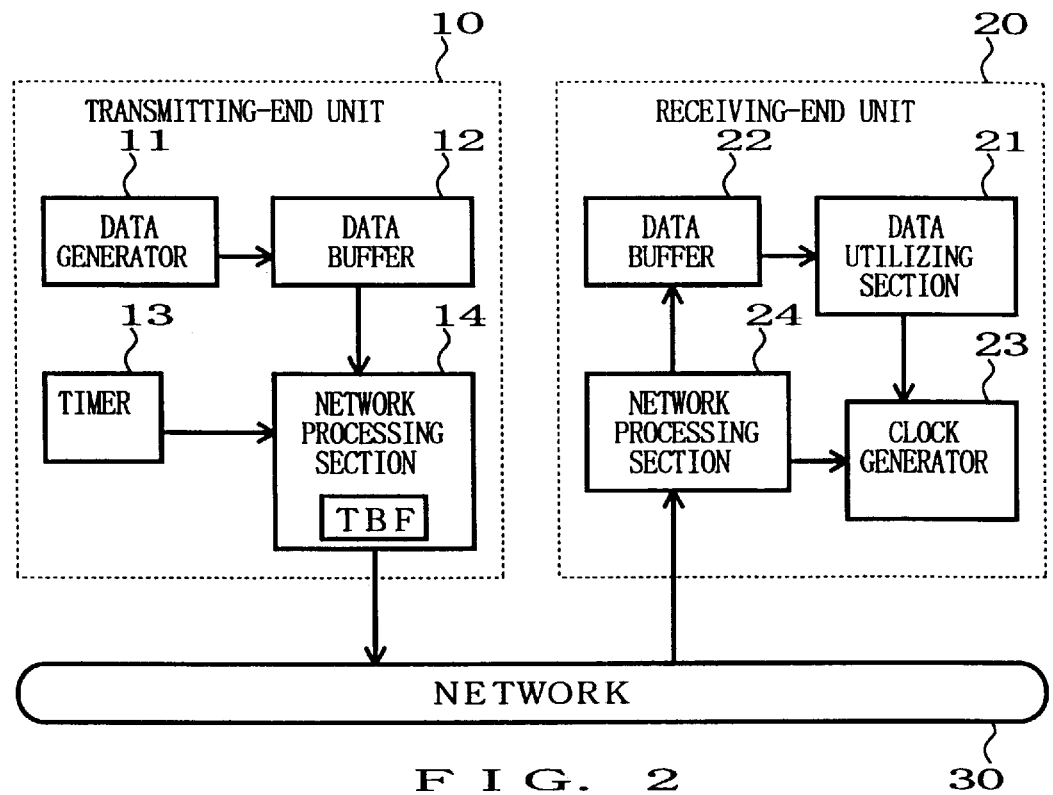
F I G. 2
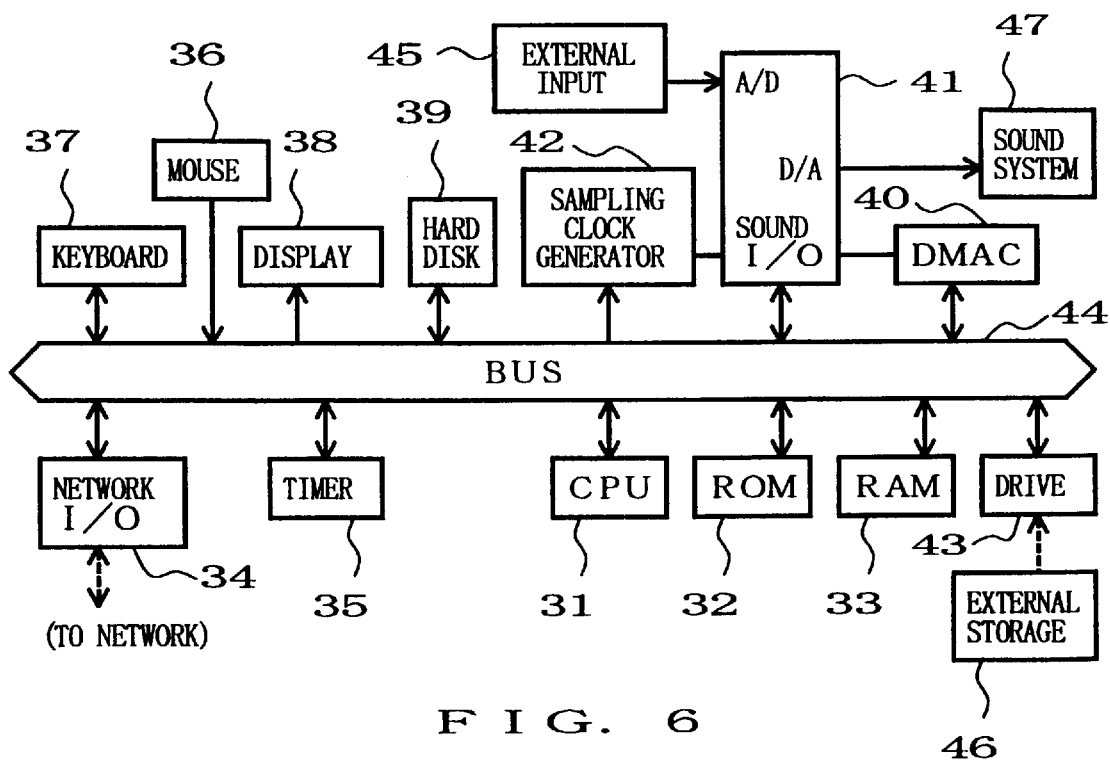
F I G. 6

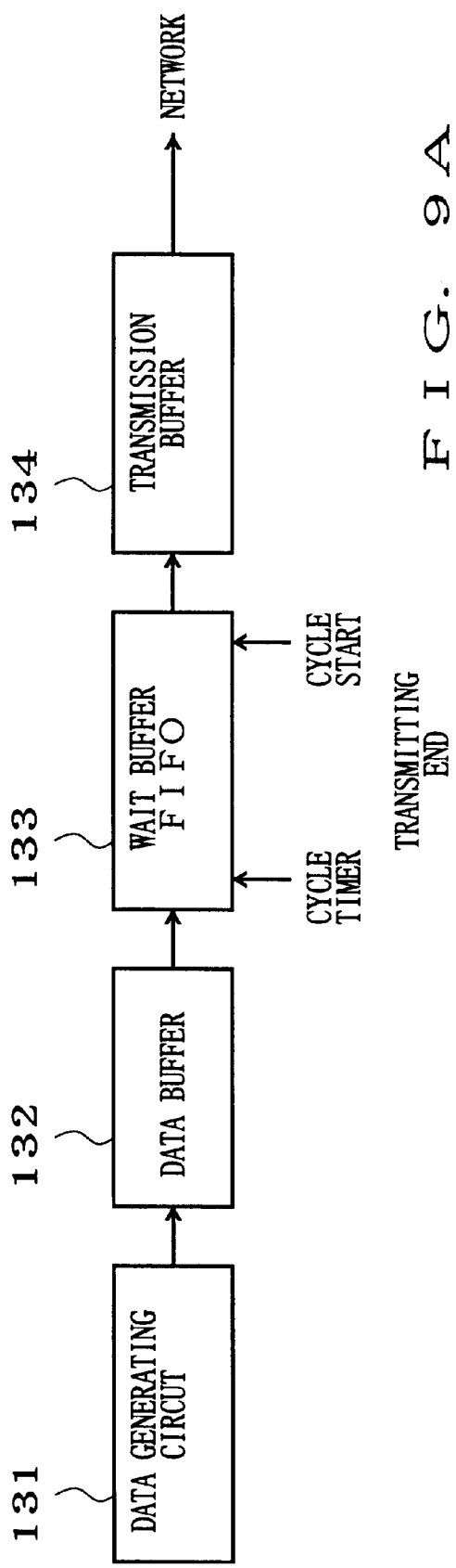
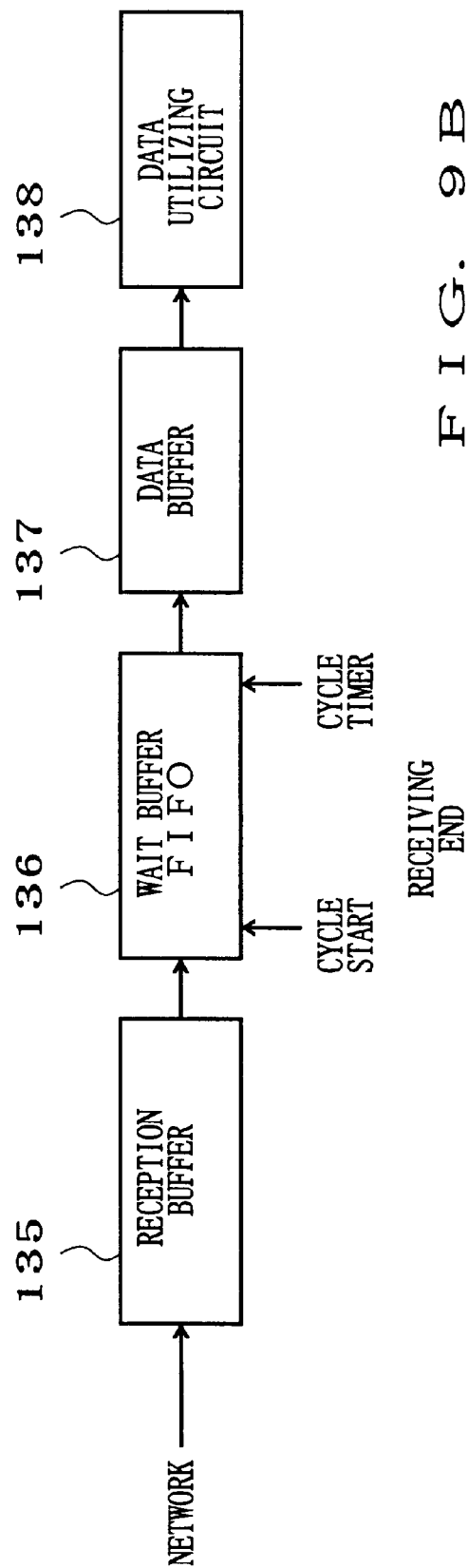

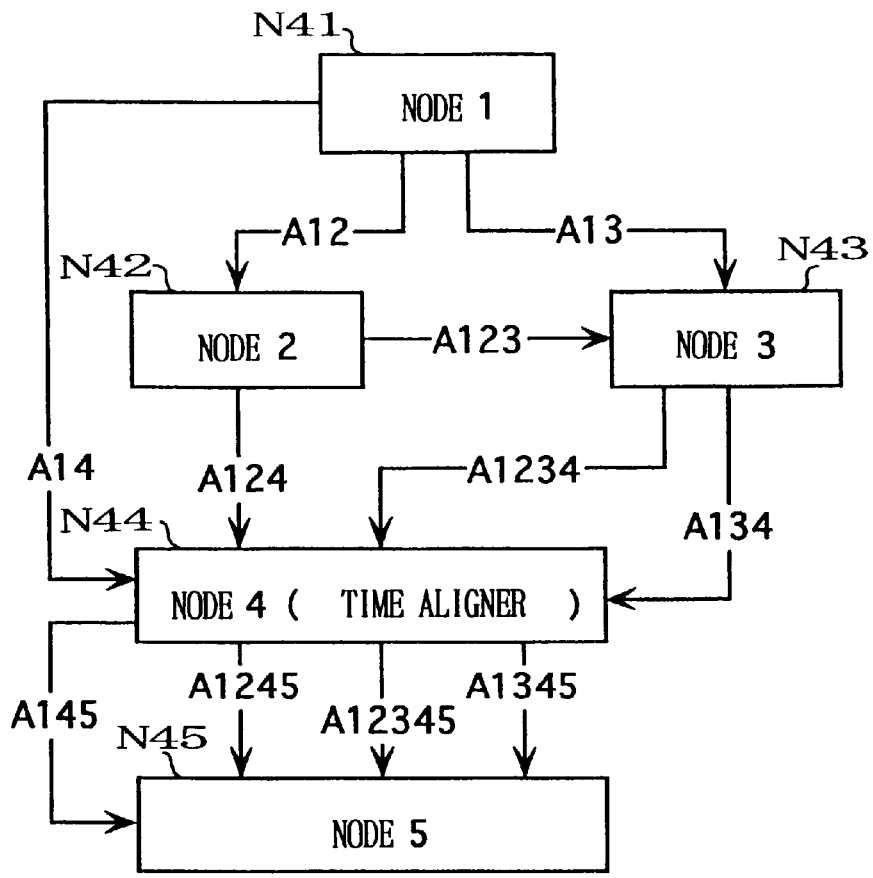
F I G. 2 0
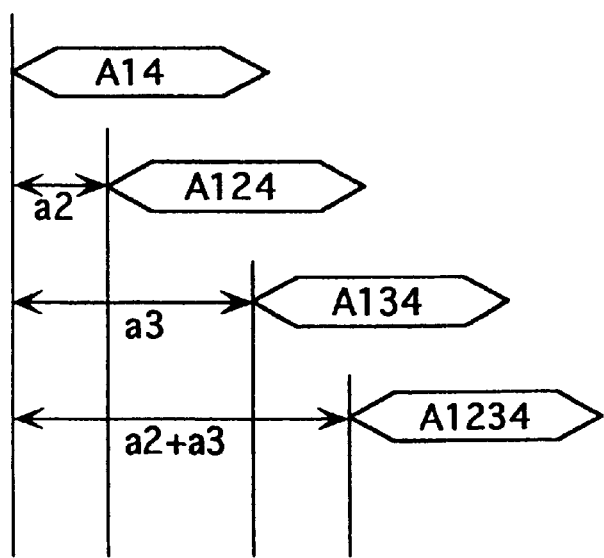
F I G. 2 1

( PRIOR ART )
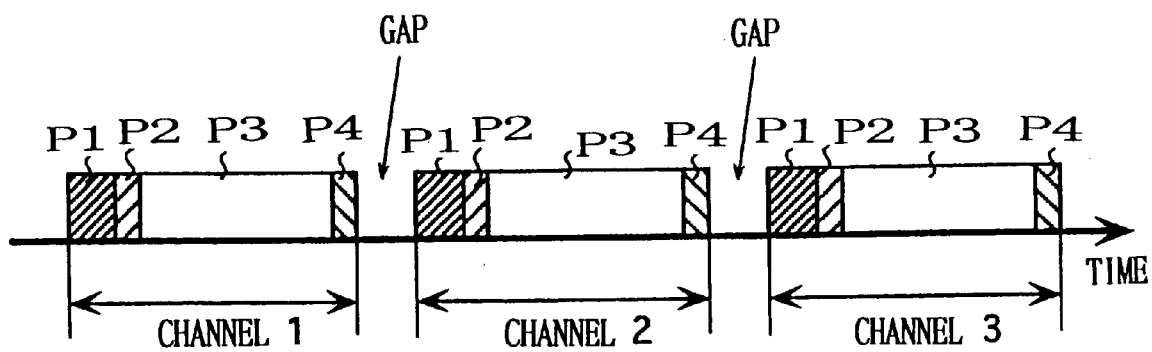
F I G. 2 7

DATA COMMUNICATION METHOD AND SYSTEM

TECHNICAL FIELD

The present invention relates generally to data communication methods and systems which, via a communication network, transmit a plurality of data, such as digital audio data, arranged in a time series of a predetermined period. More particularly, the present invention relates to a data communication method and system in which data are arranged at a transmitting end in such a format that allows a receiving end to accurately reproduce a time-positional relationship between the individual data.

The present invention also relates to data transmitter/receiver devices and data communication systems which communicate time-stamped data via a communication network.

The present invention further relates to data communication systems which receive time-stamped data from a segment on a communication network and then transfer the received data to another segment on the communication network.

Furthermore, the present invention relates to methods of and devices for synchronizing network data.

BACKGROUND ART

Data communication systems using a communication network can be classified roughly into synchronous and asynchronous types. The synchronous-type data communication system allows the transmitting end and receiving end to operate synchronously with each other and hence is well suitable for use in an audio data transmission that requires an accurate reproduction, at the receiving end, of time positions of received data. However, the conventionally-known synchronous-type data communication system only has a very limited use because it needs particular arrangements to permit synchronization between the two ends, such as provision of a separate synchronizing signal line, and also has to statically maintain a communication band due to the synchronization. This would result in the communication band unnecessarily remaining reserved even when a synchronized communication is not required at all, and therefore a significant problem would be encountered that the no other information can be transmitted through the communication band.

In contrast, the asynchronous-type data communication system can avoid the above-mentioned problem encountered by the synchronous-type data transmission by dynamically reserving a necessary communication band, but would present another problem of reduced communication efficiency unless communication overheads are reduced by organizing together some pieces of information relatively densely in each asynchronous packet to be issued. Such a packet with the densely organized information would, however, often lose information indicative of original time positions of the individual data. To avoid this problem, it has been proposed, in the packet-based data transmission, to transmit data along with additional information indicative of time positions of the data; namely, the data and time information—commonly called "time stamp"—indicative of respective time positions of the individual data are included together in a packet to be sent from the transmitting end.

However, the proposed approach of attaching the time information to each individual data would lead to very poor efficiency because of a significant increase in the total data quantity.

As another communication scheme for communicating data via a communication network, there has been known an "isochronous" data communication system, which can be referred to as a compromise between the above-mentioned synchronous-type data communication system characterized by successive transmission of same-period signals between the transmitting and receiving ends and the asynchronous-type data communication system characterized by intermittent communication of predetermined information units. This isochronous data communication system permits data communication with increased real-time responsiveness where possible time delays are well compensated for by securing a necessary frequency band in advance.

The following paragraphs describe in more detail the isochronous data communication system with reference to FIG. 25. This figure shows exemplary arrangement of packets on a system bus called "IEEE1394 high-speed serial bus"; specifically, three different kinds of packets, i.e., a cycle start packet 101, isochronous packet 102 and asynchronous packet 103, are provided on a communication network. Each dotted line in FIG. 5 denotes a first timing signal (cycle synch) indicating reference timing in the system, which has a period of 125 μsec. (8 KHz).

The cycle start packet 101 is sent from one of a plurality of nodes connected to the bus which is called a cycle master node, and a new data transmission cycle is initiated with the cycle start packet 101. The has a precise clock pulse source that generates the first timing signal. The cycle start packet 101 is normally transmitted at time intervals corresponding to generation timing of the first timing signal; however, when another packet is being transmitted, transmission of the cycle start packet 101 is waited or delayed until transmission of the other packet has been completed. Reference numeral 104 denotes a delay time with which transmission of the cycle start packet 101 is delayed (start delay time), and this start delay time is included in the cycle start packet 101 in coded form and sent to each of the nodes. It is guaranteed that each packet sent from the node at a given clock period is received by another node within the same clock period.

Each of the nodes is provided with a 32-bit cycle timer register. The cycle timer register uses its lower 12 bits to count 24.576 MHz clock pulse signals (with a period of 40.7 nsec.), which are generated as system's reference clock pulses, modulo 3,072. The cycle timer register uses other 13 bits, higher in position than the lower 12 bits, to count the above-mentioned 8kHz reference cycles, and also uses its uppermost seven bits to count seconds. Using the cycle start packet 101, the above-mentioned cycle master allows stored contents of its own register to be copied into the cycle timer registers of all the nodes, and also allows all the nodes to be synchronized with each other to within a given phase difference. Thus, in the communication network, a common time standard is provided.

The isochronous packet 102 is a data channel used to transfer data requiring precise timing reference, such as digital sound, video and performance data, and it is guaranteed that each of the isochronous packets 102 is transmitted within a predetermined transmission cycle associated therewith; for example, it is guaranteed that each of the isochronous packets 102 is transmitted, within the associated transmission cycle, to up to 63 channels for a maximum time period of 100 μsec.

Further, the asynchronous packet 103 is a packet which is transmitted asynchronously when there is an empty time in the associated transmission cycle after completion of the transmission of the above-mentioned isochronous packet

102. It is assumed here that the asynchronous packet has a maximum length of 75 μsec. The asynchronous packet continues to be transferred until all the data of the packet have been completely transferred, so that it is likely that the transfer of this packet will continue beyond the period of the cycle timer.

In order to guarantee reproducibility of data on the time axis in transmitting time-serial data, such as sound, video or performance data using any of various networks, the data are transmitted along with a time stamp indicative of a particular time point when the data are to be reproduced, if the transmission path is not capable of a completely synchronous communication. In this case, the receiving end refers to the time stamp and initiates the reproduction of the data upon arrival at the time point indicated by the time stamp.

Each time stamp used on such a communication network must be interpreted in one meaning. Namely, the time stamp requires a cyclic period greater than a time length that is considered to be appropriate to some extent and therefore requires a great amount of information. Where information is in digital representation, a large amount of information, i.e., a great number of bits, would be required to increase the resolution of time specified by the time stamp, because a large amount of information involves a great number of bits. In the illustrated example of FIG. 25, for example, there are employed 32-bit time stamps.

In the above-mentioned communication technique of the type which transmits data with time stamps, time stamp information has to be sent every predetermined period in addition to the data, and it is desirable that a proportion of the time stamp information to the transmitted data be as small as possible.

However, the number of bits allocated to each time stamp has to be increased in order to guarantee the one-meaning requirement of the time stamp and raise the resolution of the time represented by the time stamp, which would inevitably lead to reduced data transfer efficiency.

Further, where data are accompanied by time stamp information indicating a particular time point to process the data, it is possible that the time stamp, at the time of arrival of the data at the receiving end, indicates an already lapsed time point due to processing delays in the network, intervening bridges and routers, etc. To avoid such an inconvenience, a sufficient number of time stamps have to be attached, taking into account possible future extension of the network and the like. However, attaching sufficient time stamps would cause significant delays in data reproduction but also would require provision of a separate buffer, at the receiving end, for temporarily storing a large quantity of data.

One possible way to reduce the necessary data quantity of the time stamps is to express them in relative values, which, however, would lose an original relative time-positional relationship between the individual data if jitters are present in the transmission paths.

As one example of the time stamp, there has been known the SMPTE time code which is a code defined by the "Society of Motion Picture and Television Engineers". According to the SMPTE time code scheme, 80-bit address data (comprising a time code represented by xx hours, xx minutes, xx seconds and xxth frame and a user bit) is attached to every frame of video data so that the address is used for editing and synchronized operation between a plurality of constituent elements or devices.

Also, with recent digitalization of various multimedia and AV (Audio-Visual) equipment, it has been proposed to interconnect a plurality of multimedia-related devices via a communication network, such as the IEEE1394 network, to thereby build a multimedia system.

In order to transmit data, such as digital sound data or video data or performance data, requiring precise timing reference, it is necessary to guarantee accurate reproducibility of these data on the time axis.

For example, in a multimedia system built by interconnecting, via network, a plurality of nodes having respective specific functions, to perform planned processes on data generated by some of the nodes, the generated data will be sent via a plurality of transmission paths or routes to other nodes in such a way that the data pass through the individual nodes performing the corresponding processes. Accordingly, the individual data will arrive at the output node with different time delays due to different processing time periods in the processing nodes located on the respective paths, so that it is no longer possible to guarantee accurate reproducibility of the data on the time axis.

Such an inconvenience is discussed more fully with reference to FIG. 26. The illustrated example of FIG. 26 assumes that four nodes, i.e., node 1 (Ni) to node 4 (N4) are interconnected via the IEEE1394 network. Although the nodes can function as various devices constituting the multimedia system as noted earlier, it is assumed here that these nodes together constitute a single tone generating apparatus, where node 1 is a tone source device, node 2 an effector for imparting a vibrato to a tone to be generated, node 3 an effector for imparting a panning effect to a tone to be generated, and node 4 a mixer for mixing together tone signals.

In the tone generating apparatus arranged as above, node 1, functioning as the tone source device, outputs a plurality of tones every predetermined timing (i.e., every frame). Let's also assume that the thus-generated tones are generally classified into four different types: the first-type tone that is to be output directly; the second-type tone that is to be imparted a vibrato; the third-type tone that is to be panned; and the fourth-type tone that is to be imparted a vibrato with subsequent panning. In such a case, the tone source device implemented by node 1 outputs each of the four types of tone data to a corresponding one of four channels of the network.

To each of the other nodes, such as node 2, node 3 and node 4, is allocated a different network channel via which the node receives the data of the individual channels. Thus, each of these nodes actually reads in only the data of the channel allocated thereto, from among the data of the individual channels received via the network, and performs the predetermined process, such as the vibrato imparting, panning or mixing process, on the read-in data. When necessary, the node sends back the thus-processed data to the network.

FIG. 27 shows exemplary arrangement of the channels on the network. As shown, packets corresponding to the channels are arranged, on the time axis, with a gap interposed between the packets. Each of the packets comprises an arbitration segment P1, and a data packet segment P3 having data preface and data end segments P2 and P4 attached to opposite ends thereof.

Note that each of the packets may be either an isochronously-transferred packet or a normal packet.

In the tone generating apparatus having its constituent elements thus interconnected via the network, each of the generated tone data which is not to be subjected to the effect imparting process is sent from the tone source device implemented by node 1, via, for example, a first channel ch1, directly to the mixer implemented by node 4 (see arrow A14). Each of the generated tone data which is to be subjected to the reverberation process is sent from the tone source node N1, via, for example, a second channel, to node 2 functioning as a reverberation processing section (see arrow A12). Further, each of the generated tone data which is to be subjected to the panning process is sent from the tone source node N1, via, for example, a third channel, to node 3 executing the panning process (see arrow A13).

The reverberation processing node or node 2 determines that tone data of the second network channel ch2 (A12) is to be received by that node N2, and thus reads in the tone data to perform a predetermined reverberation process on the read-in tone data. Each of the tone data having undergone the reverberation process which is to be further subjected to the panning process is sent via the fourth channel ch4 to the panning processing node N3 (see arrow A123). On the other hand, each of the tone data having undergone the reverberation process which is to not be subjected to the panning process is sent by way of, for example, a fifth channel ch5 to the mixer node N4 (see arrow A124).

The panning processing node N3 or node 3 determines that the tone data sent from node 1 via the third channel ch3 (A13) and the tone data sent from node 2 via the fourth channel ch4 (A123) are to be received by the node N3, and thus receives these data to perform a predetermined panning process on the data. After that, the data received via the fourth channel ch4 and subjected to the panning process is sent from the panning processing node to node 4 via a sixth channel ch6 (A1234), while the data received via the third channel ch3 and subjected to the panning process is sent from the panning processing node to node 4 via a seventh channel ch7 (A134).

With the above-noted arrangements, the tone data generated by the tone source node N1 or node 1 are sent to the mixer node N4 via four routes as follows: (1) the first route for the tone data sent directly via the first channel (A14); (2) the second route for the tone data of the fifth channel ch5 having undergone the reverberation process in node 2 (A124); (3) the third route for the tone data of the sixth channel ch6 having undergone the reverberation process in node 2 and then the panning process in node 3 (A1234); and the fourth route for the tone data of the seventh channel ch7 having undergone the panning process in node 3 (A134).

In the foregoing manner, each of the tone data generated by the tone source node N1 or node 1 is supplied to the mixer node N4 by way of one of the four different routes; however, even the tone data generated at same timing from the tone source node N1 would reach the mixer node N4 or node 4 at different time point s depending on the routes they took, because node 2 and node 3 require some time for execution of the respective processes. If the time necessary for the process in node 2 is represented by a2 and the time necessary for the process in node 3 is represented by a3, the tone data passed through the second, third and fourth routes would reach node 4 with time delays corresponding to the delay times a2, a2+a3 and a3, respectively. As a consequence, there would occur time differences in the data mixing by the mixer node N4.

Although it has been simply stated above that different arrival times of the tone data passed through the different routes are due to processing time delays in the individual nodes, the actual time for each of the nodes to send the data out to the network may, in fact, vary depending on a traffic condition on the network. Besides, the time differences of the tone data arriving at node 4 tend to vary in many cases, because the processing time of each of the nodes is not necessarily constant.

DISCLOSURE OF THE INVENTION

It is therefore a first object of the present invention to provide a data communication system which is suitably applicable to a case where a plurality of data, such as digital audio data, arranged in a time series of a predetermined period are transmitted from a transmitting end via a communication network in such a format that allows a receiving end to accurately reproduce an original time-positional relationship between the transmitted data, and which, while allowing a user to enjoy the benefits of an asynchronous packet, can effectively reduce a total quantity of transmitted data per packet by expressing, in minimized data quantity, time information to be contained in and transmitted with the packet.

The present invention also seeks to to provide a data communication system which can minimize a time delay that would occur between a transmitting end and a receiving-end.

The present invention also seeks to provide a data communication system which, in a case where time information is expressed in reduced data quantity, can substantially simplify arithmetic operations carried out at a receiving end for reproducing the time information.

It is a second object of the present invention to provide a technique which is suitably applicable to a data communication system designed to transmit data with a time stamp attached thereto and which permits accurate reproduction of the transmitted data on the time axis and also can effectively enhances data transmission efficiency by reducing the total number of bits in the time stamp.

It is a third object of the present invention to provide a data communication system which, in a case where data is transmitted via a bridge and router, can reduce the number of bits in a time stamp to be sent with the data, can avoid a time delay in reproduction of the transmitted data, and also can avoid a loss of relative time-positional relationship between the individual data.

It is a fourth object of the present invention to overcome the above-discussed problems and thereby allow data, passed through a plurality of routes on a communication network, to arrive at a predetermined node in synchronism with each other.

In order to accomplish the above-mentioned objects, a first aspect of the present invention provides a data communication method which comprises the steps of:
(a) at a transmitting end,
supplying a plurality of data arranged in a time series of a predetermined period;
specifying one data from among every predetermined number, not smaller than two, of the data supplied by the step of supplying and attaching to the specified data time information indicative of a time position of the specified data; and
transmitting the predetermined number of the data supplied by the step of supplying and the time information attached to any one of the predetermined number of the data, together as a packet, to a communication network, and
(b) at a receiving end,
receiving the packet via the communication network;
temporarily storing the data contained in the received packet; and sequentially reading out the temporarily stored data and controlling sequential readout of the temporarily stored data on the basis of the time information contained in the received packet, to thereby allow the read-out data to be reproduced with a period corresponding to said predetermined period.

According to the first aspect of the present invention, one particular data is specified from among every predetermined number, not smaller than two, of the supplied data (or unit data group) so that time information is attached only to the specified data, as compared to the conventionally-known methods where such time information is attached to each individual data to be transmitted. Also, a packet is formed of the predetermined number of the supplied data and the time information attached to any one of the data, and the thus-formed packet is transmitted from the transmitting end via the communication network to the receiving end. The receiving end receives the transmitted packet via the communication network and temporarily stores the data of the received packet. Then, the receiving end sequentially reads out the stored data and allows the read-out data to be reproduced in a cycle corresponding to the predetermined period by controlling the sequential readout of the stored data on the basis of the time information contained in the received packet. As a result, the data communication method of the present invention, while allowing users to enjoy the benefits of an asynchronous packet communication, can effectively reduce a total quantity of transmitted data per packet by expressing time information for the packet in minimized data quantity.

Further, according to a second aspect of the present Invention, there is provided a data communication method which comprises the steps of:

(a) at a transmitting end,
supplying a plurality of data arranged in a time series of first period;
specifying one data from among every predetermined number, not smaller than two, of the data supplied d by the step of supplying and attaching to the specified data time information Indicative of a time position of the specified data; and
every predetermined second period longer than the first period, transmitting the supplied data within a given cycle of the second period and the time information attached to any one of the predetermined number of the data, together as a packet, to a communication network, and (b) at a receiving end,
receiving the packet via the communication network;
temporarily storing the data contained in the received packet; and
sequentially reading out the temporarily stored data and controlling sequential readout of the temporarily stored data on the basis of the time information contained in the received packet, to thereby allow the read-out data to be reproduced with a period corresponding to said first period.

According to the second aspect of the present invention, similarly to the above-discussed first aspect, one particular data is specified from among every predetermined number, not smaller than two, of the supplied data (or unit data group) so that time information is attached only to the specified data, in stead of such time information being attached to each individual data to be transmitted. Also, every predetermined second period longer than the first period, a packet is formed of the predetermined number of the supplied data and the time information attached to any one of the data, and the thus-formed packet is transmitted from the transmitting end via the communication network to the receiving end. The receiving end receives the transmitted packet via the communication network to temporarily store the data of the received packet. Then, the receiving end sequentially reads out the stored data and allows the read-out data to be reproduced in a cycle corresponding to the first or original period by controlling the sequential readout of the stored data on the basis of the time information contained in the received packet. Thus, similarly to the above-mentioned, the data communication method of the invention, while allowing users to enjoy the benefits of an asynchronous packet communication, can effectively reduce a total quantity of transmitted data per packet by expressing time information for the packet in minimized data quantity.

In addition, by executing the packet transmission every predetermined second period, the second aspect can minimize time delays that would occur in data transmission between a transmitting end and a receiving end, without having to wait until after a predetermined number of data have been accumulated.

The term "asynchronous packet" as used herein refers to a packet whose a transmission period is set independently of a sampling period of original sample data to be transmitted; however, the present invention affords a properly synchronized communication because the transmission and reception of the packet are conducted with a same fixed period.

In order to accomplish the second object, the present invention provides a data transmitter device which sends data to be transmitted, having attached thereto a time stamp represented as a time difference from a first timing signal having a predetermined period, to a communication network on the basis of a second timing signal generated in accordance with the first timing signal. This data transmitter device includes a FIFO buffer and writes the data to be transmitted into the FIFO buffer on the basis of the first timing signal. The data transmitter device then retrieves the data to be transmitted from the FIFO buffer on the basis of the second timing signal and sends the retrieved data to the communication network.

The present invention also provides a data receiver device which receives data having attached thereto a time stamp represented as a time difference from a first timing signal having a predetermined period and transmitted to a communication network on the basis of a second timing signal generated in accordance with the first timing signal. This data receiver device includes a FIFO buffer and writes the data received via the communication network into the FIFO buffer on the basis of the second timing signal. The data receiver device then retrieves the received data from the FIFO buffer on the basis of the first timing signal and reproduces the retrieved data on a time axis on the basis of the time stamp attached thereto.

Further, the present invention provides a data communication system which comprises a data transmitter device and a data receiver device and where data communication on a communication network is controlled on the basis of a second timing signal generated in accordance with a first timing signal having a predetermined period. In this data communication system, the data transmitter device attaches a time stamp, represented as a time difference from the first timing signal, to data to be transmitted, and writes the data with the time stamp into a first FIFO buffer on the basis of the first timing signal. The data transmitter device then retrieves the data to be transmitted from the first FIFO buffer on the basis of the second timing signal and sends the retrieved data to the communication network. The data receiver device receives and writes the data, sent by the data transmitter device to the communication network, into a second FIFO buffer on the basis of the second timing signal, then retrieves the data from the second FIFO buffer on the basis of the first timing signal and reproduces the retrieved data on a time axis on the basis of the time stamp.

In order to accomplish the third object, the present invention provides a data transfer system for use in such a communication scheme where there are performed both isochronous communication that, using nominally-set cycles and bands reserved in corresponding relation to individual ones of the cycles, transmits data following transmission of a cycle start packet and asynchronous packet communication that transmits data using a remaining period of the cycle, and where a sum of a necessary period for the isochronous communication and a necessary period for the asynchronous packet communication being allowed to exceed the period of the cycle. Upon reception of the data having attached thereto a reproducing time stamp indicative of a specific data-reproducing time point, a delay time of the received data is detected on the basis of the cycle start packet which the received data belong to. A time value, obtained by adding one period time length of the cycle and the detected delay time to a time value of a start point of the cycle which the cycle start packet belongs to, is attached to the received data as a transferring time stamp. When time represented by the transferring time stamp has arrived or lapsed, necessary preparations are made for transferring the received data.

In the above-mentioned data transfer system, a bridge inserted in a communication network receives the data from a given segment. When time represented by the transferring time stamp has arrived or lapsed, the bridge transfers the received data to a wait buffer, and when a predetermined cycle start packet is sent out to another segment, the bridge transfers the received data from the wait buffer to a transmission buffer to transmit the data to the other segment.

Further, in the above-mentioned data transfer system, the reproducing time stamp is indicative of a relative time position within the cycle. The reproducing time stamp is replaced with a new time stamp that is obtained by adding one period time length of the cycle to the time value of the start point of the cycle which the cycle start packet, preceding the received data, belongs to. An operation for reproducing the received data is performed when time represented by the new time stamp has arrived or lapsed.

Because a time value, obtained by adding one period time length of the cycle and the delay time of the received data behind the corresponding cycle start packet to the time value of the start point of the cycle which the cycle start packet belongs to, is attached to the received data as a transferring time stamp, the data transfer can be executed with increased efficiency, and it is possible to effectively avoid loosing a relative time-positional relationship between the individual data.

Further, because the reproducing time stamp is replaced with a new time stamp that is obtained by adding one period time length of the cycle to the time value of the start point of the cycle which the cycle start packet, preceding the received data, belongs to, the data reproduction can be executed with increased efficiency while effectively avoiding a loss of the relative time-positional relationship between the individual data, even when the reproducing time stamp is of a small bit size or length, say, below 32 bits.

In order to accomplish the fourth object, the present invention provides a method of synchronizing a plurality of data transmitted to a communication network having a plurality of nodes connected thereto. According to this method, one of the nodes, designated to transmit a plurality of data to be synchronized, attaches a predetermined data mark to the data and sends the data with the data mark to the communication network. Another of the nodes, having received the data via the communication network, synchronizes the received data by reference to the data mark attached thereto.

Further, the present invention provides a device for synchronizing a plurality of data transmitted to a communication network having a plurality of nodes connected thereto. On the basis of a data mark contained in the data received via the communication network, the device synchronizes a group of the data that has the same data mark attached thereto. At least one of the nodes connected to the communication network has a function of the device for synchronizing a plurality of data transmitted to the communication network.

BRIEF DESCRIPTION OF THE DRAWINGS

In the accompanying drawings,

FIG. 6 is a block diagram illustrating a hardware structure of a device, such as a personal computer, that can be suitably used either as the transmitting-end unit or as the receiving-end unit in the embodiment of FIG. 2;

FIG. 9A is a functional block diagrams explanatory of a data transmitter device in the data communication system of FIG. 7;

FIG. 9B is a functional block diagrams explanatory of a data receiver device in the data communication system of FIG. 7;

FIG. 20 is a block diagram showing an example of a network system to which is applied a network data synchronizing method in accordance with a fourth embodiment of the present invention;

FIG. 21 is a time chart showing a manner in which the various data arrive at a particular node respective route in the fourth embodiment;

FIG. 26 is a block diagram showing an example of a conventional network system; and FIG. 27 is a diagram explanatory of exemplary data channels in the conventional network system.

BEST MODE FOR CARRYING OUT THE INVENTION

For better understanding of the present invention, the preferred embodiments of the invention will be described in greater detail below with reference to the accompanying drawings.

Figure 1:
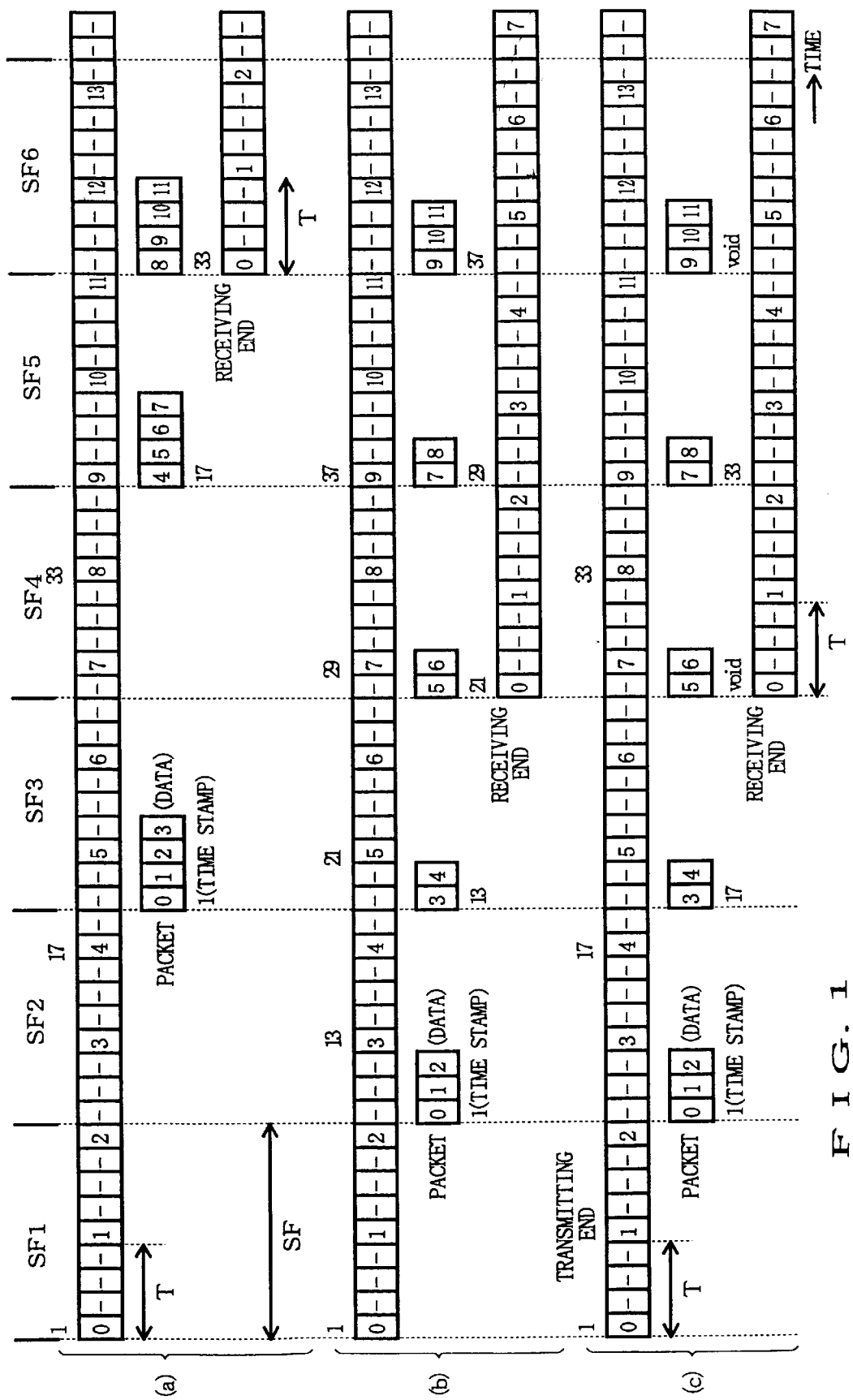
FIG. 1 is a timing chart illustratively showing detailed examples of a data communication method and system according to the principle of the present invention.

To facilitate fuller understanding of the present invention, FIG. 1 illustratively shows several detailed examples of the data communication system according to the present invention. In FIG. 1, section (a) shows an example of the data communication system according to a first aspect of the present invention, and sections (b) and (c) show two different examples of the data communication system according to a second aspect of the present invention.

On the first row in each of sections (a), (b) and (c) of FIG. 1, there is shown exemplary a time-series of data, having a predetermined cyclic time or period (first period) T, supplied to a transmitting end, and numerals "0", "1", "2", "3", . . . are ordinal numbers indicative of respective positions or places, in the time series, of the individual data. Further, numerals (1, 13, 17, 21, 29, 33, etc.), noted slightly above the particular data on the first row, each indicate a time stamp or time information attached to the corresponding data. reference character "SF" represents a period of a packet transmission service section. While the period T of data to be transmitted (i.e., transmission data) is variable as required, the period of the service section SF in an asynchronous packet is fixed to a predetermined value. Thus, the time-positional relationship between the two periods SF and T can be varied as desired rather than being limited to that shown in the figure; generally, the periods of the two are in non-integral multiple relationship (of course, they may sometimes go into integral multiple relationship).

On the second row in each of sections (a), (b) and (c) of FIG. 1, there are shown conditions of each packet to be transmitted via a communication network. Numerals noted within time slot frames are ordinal numbers each identifying one of the data contained in the packet, and numerals (1, 13, 17, 21, 29, 33, etc.), noted slightly below the time slot frames, each indicate a time stamp or time information contained in the corresponding packet. Further, on the third row in each of sections (a), (b) and (c) of FIG. 1, there are shown data reproducing conditions at the receiving end.

Referring first to the example of section (a) (section (a) example) according to the first aspect of the present invention, each of the packets is formed by a predetermined number N (N=4 in the illustrated example) of data, and the forefront. i.e., first data in the packet is specified to attach a time stamp indicative of a time position of the first data, prior to the packet transmission. For example, the forefront, i.e., first packet in the illustrated example is composed of four data denoted by ordinal numbers "0", "1", "2" and "3" and has a single time stamp "1" attached thereto that is indicative of a time position of the first data denoted by ordinal number "0". In this case, two cyclic periods of the service section (i.e., time corresponding to two service sections) are necessary for the transmitting end to be supplied with the four data, so transmission of the first packet is executed upon passage of two service sections SF after the supply of the first data (ordinal number "0"). Thus, a time delay in starting the packet transmission amounts to two cyclic periods of the service section SF. The second packet in the illustrated example is composed of four data denoted by ordinal numbers "4", "5", "6" and "7" and has a single time stamp "17" attached thereto that is indicative of a time position of the first data denoted by ordinal number "4". In this case, transmission of the second packet is executed in a service section ("SF5") following a service section ("SF4") where the last data denoted by ordinal number "7" in the second packet is supplied; that is, transmission of the second packet is executed upon passage of two service sections SF after the transmission of the first packet.

At the receiving end, the original predetermined period T set at the transmitting end can be estimated on the basis of a variation or function of the time stamps contained in the sequentially supplied packets. Although the original predetermined period T set at the transmitting end may be estimated in a variety of ways, one of the most typical ways is by evaluating the following equation based on a difference between values of two successive time stamps. That is, if the time stamp values of a current received packet and last received packet are represented by TS(i) and TS(i−1), respectively, the original predetermined period T can be estimated by executing the following arithmetic operation since N data exist in between the time stamps:

$$T=\{TS(i)-TS(i-1)\}/N \qquad \text{(Equation 1)}$$

The receiving end sequentially reads out the data in the received packets, in cycles corresponding to the estimated original period T. This permits a reliable data reproduction with the original period T at the receiving end. In the example illustrated in section (a) of FIG. 1, the periodestimating calculation necessitates a wait until after transmission of two packets, and thus the receiving end is allowed to initiate the data reproduction only upon passage of five service sections SF after the supply of the first data (ordinal number "0") to the transmitting end, i.e., at the beginning of the sixth service section of FIG. 1.

As noted above, if the number of data per packet is fixed to a predetermined number N as in the communication system according to the first aspect of the invention, the time delays in starting the packet transmission and in the data reproduction at the receiving-end unit would present significant problems. So, the communication system according to the second aspect of the invention is designed to effectively avoid the problems raised by such time delays.

Examples of the communication system according to the second aspect of the invention illustratively shown in sections (b) and (c) of FIG. 1 are different from the first-aspect communication system in that there are arranged to regularly initiate the packet transmission every predetermined period (second period) without having to wait until after a predetermined number of data are accumulated and hence in that the number of data forming a packet is variable. More specifically, every predetermined second period longer than the first period T that is an original period of data to be transmitted (transmission data) from the transmitting end, a packet is formed of data supplied within a cycle of the second period, so that the packet transmission is executed once for every second period. Further, because the first and second periods are in non-integral multiple relationship (although they may of course sometimes go into integral multiple relationship), the number of data contained in each cycle of the second period will vary within a variation range of ±1. In the examples illustrated in sections (b) and (c) of FIG. 1, the second period which to execute the packet transmission corresponds to the period of each service section SF.

In the example illustrated in section (b) (section (b) example) of FIG. 1, all data supplied in each of the service sections are included in a packet and then transmitted from the transmitting end to the communication network in the next service section. The total number "x" of data included in each packet is a variable which is 2 or 3 in the illustrated example. Also, in the example of section (b) of FIG. 1, the first data of each packet is specified so as to attach thereto a time stamp indicative of a time position of the first data. As a consequence, the time stamp is attached to every predetermined number of data (i.e., every two or more data); this predetermined number is a variable linked with the above-mentioned variable number "x" of data forming a single packet. For instance, the first packet in this example is composed of three data denoted by ordinal numbers "0", "1" and "2" and has a single time stamp "1" attached thereto that is indicative of a time position of the first data denoted by ordinal number "0" in the packet. In this case, transmission of the first packet is executed upon passage of one service section SF after the supply of the first data (ordinal number "0"), i.e., in the second service section. Thus, the time delay in starting the packet transmission amounts to only one cyclic period of one service section SF. The second packet in the illustrated example is composed of two data denoted by ordinal numbers "3" and "4" and has a single time stamp "13" attached thereto that is indicative of a time position of the first data denoted by ordinal number "3" in the two-data group. In this case, transmission of the second packet is executed in a service section ("SF3") following the service section ("SF2") where the last data denoted by ordinal number "4" in the second packet is supplied; that is, transmission of the second packet is executed upon passage of one service section SF after the transmission of the first packet.

Similarly to the example of section (a) of FIG. 1, the receiving end can estimate the original predetermined period T set at the transmitting end on the basis of a variation or function of the time stamps contained in the sequentially supplied packets. Although the original predetermined period T at the transmitting end may be estimated in a variety of ways, one of the most typical ways is by executing the following arithmetic operation based on a difference between values of two successive time stamps:

$$T=\{TS(i)-TS(i-1)\}/x \qquad \text{(Equation 2)}$$

where $TS(i)$ and $TS(i-1)$ represent the time stamp values of a current received packet and last received packet, respectively, and "x" represents the above-noted variable number of data contained in the last received packet.

The receiving end sequentially reads out the data in the received packets, in cycles corresponding to the estimated original period T. This permits a reliable data reproduction with the original period T at the receiving end. In the example of section (b) of FIG. 1, because the second packet is transmitted from the transmitting end in the third service section SF3 as counted from the time point when the first data (ordinal number "0") has been supplied to the transmitting end, the receiving end is allowed to initiate the data reproduction upon passage of three service sections SF after the supply of the first data (ordinal number "0") to the transmitting end, i.e., in the fourth service section SF4 of FIG. 1. It may be seen that in the example of section (b) of FIG. 1, the packet transmission and the data reproduction at the receiving end are started earlier than those in the section (a) example so that significant improvements are achieved to alleviate the problems raised by the time delays. However, as seen in Equation 2 above, reproduction of the time information at the receiving end in the section (b) example involves a division by the variable number "x" and this divisor "x" has to be changed every time, resulting in a more complex arithmetic operation as compared to the arrangement where the division is made by the fixed number N as in Equation 1 above.

The example illustrated in section (c) of FIG. 1 is directed to simplifying the arithmetic operation at the receiving end by making further improvements over the section (b) example. More specifically, in this example, all data supplied in each one of the service sections are included in a packet and then transmitted from the transmitting end to the communication network in the next service section. This example is similar to the section (b) example in that the number "x" of data included in each packet is variable (2 or 3) but different therefrom in the manner of attaching the time information. More specifically, the section (c) example is arranged to specify one data every predetermined fixed number M of data (two or more data) so as to attach, to the specified data, a time stamp indicative of its time position. In the illustrated example, the predetermined fixed number M is 4, so that every four data, a time stamp is attached that is indicative of the first data in this four-data group. Thus, although one time stamp is attached every predetermined fixed number M of data (two or more data) in the section (c) example, this number M (4 in the illustrated example), unlike in the section (b) example, is not linked with or independent of the variable number "x" of packet forming data.

In the example illustrated in section (c) of FIG. 1, the first packet is composed of three data denoted by ordinal numbers "0", "1" and "2" and has a single time stamp "1" attached thereto that is indicative of a time position of the first data (ordinal number "0" ) in the first M (=4)-data group. In this case, transmission of the first packet is executed upon passage of one service section SF after the supply of the first data (ordinal number "0"). Thus, the time delay in starting the packet transmission amounts to only one cyclic period of the service section SF. The second packet in the illustrated example is composed of two data denoted by ordinal numbers "3" and "4" and has a time stamp "17" attached thereto that is indicative of a time position of the first data denoted by ordinal number "4" in the next M (=4)-data group. In this case as well, transmission of the second packet is executed in a service section ("SF3") following the service section ("SF2") where the last data denoted by ordinal number "4" contained in the second packet has been supplied; that is, transmission of the second packet is executed upon passage of one service section SF after the transmission of the first packet.

Because the number M of data in each data group to which is attached a time stamp is invariably fixed while the number of data per packet is variable, there is a possibility that no time stamp will be attached to some of the packets. In the section (c) example, for example, no time stamp is attached to the packet containing data denoted by ordinal numbers "5" and "6" transmitted in the fourth service section SF4, and such a packet is transmitted from the transmitting end unit along with predetermined empty data "void" indicating absence of the "time stamp", in stead of data indicating a valid time stamp value. Of course, the transmission of the empty data "void" is not necessarily essential; instead, the packet with no time stamp may be directly recognized as not being accompanied by time information.

Similarly to the examples of sections (a) and (b) of FIG. 1 as described above, the receiving end can estimate the original predetermined period T set at the transmitting end on the basis of a variation or function of the time stamps contained in the sequentially received packets. Although the original predetermined period T set at the transmitting end may be estimated in a variety of ways, one of the most typical ways is by executing the arithmetic operation based on a difference between values of two successive time stamps:

$$T=\{TS(i)-TS(i-1')\}/M \quad \text{(Equation 3)},$$

where TS(i) and TS(i-1') represent the time stamp values of a current received packet and last received packet, respectively. Therefore, no such arithmetic operation is effected if the current received packet contains the "void" data in stead of a valid time stamp. Further, if the last received packet contains a valid time stamp value other than the "void" data, then the value TS($i$-1') is equivalent to the time stamp value of the last received packet; on the other hand, if the last received packet contains the "void" data rather than a valid time stamp value, then the value TS($i$-1') is equivalent to a time stamp value TS($i$-2) of the second received packet before the current received packet. As previously noted, "M" is a fixed number of data in a data group to which is attached a single time stamp.

The receiving end sequentially reads out the data in the received packets, in cycles corresponding to the estimated original period T. This permits a reliable data reproduction with the original period T at the receiving end. Because the second packet is transmitted from the transmitting end in the third service section SF3 as counted from the time point when the first data (ordinal number "0") has been supplied to the transmitting end, the receiving end is allowed to initiate the data reproduction upon passage of three service sections SF after the supply of the first data (ordinal number "0") to the transmitting end, i.e., in the fourth service section SF4 of FIG. 1. Thus, it may be seen that in the example of section (c) of FIG. 1, the packet transmission and the data reproduction at the receiving end are started earlier than those in the section (a) example so that significant improvements are made to the problems raised by the time delays. Further, as seen in Equation 3 above, reproduction the time information at the receiving end in the section (c) example involves a division by the fixed number M and hence can substantially simplify the arithmetic operation as compared to the arrangement where the division is made by the variable number "x" as in Equation 2 above. By setting the fixed number M to the power of 2 such as 4 or 8, the digital division of Equation 3 can be executed via simple data shifting. Thus, by expressing the time information in reduced data quantity, the section (c) example can provide a data communication system based on asynchronous packets which minimizes the complexity of the time information reproducing arithmetic operation at the receiving end.

From the foregoing, it may be understood that the section (c) example according to the second aspect of the present invention can provide a most preferable data communication system. The present invention may be practiced on the basis of the assumption that the transmitting-end unit conducts an asynchronous packet communication in such a most preferable form. Namely, from that viewpoint, the data communication method according to the present invention is characterized in that it comprises a step of supplying a plurality of data arranged in a time series of a first period, a step of specifying one data, in each group composed of a predetermined fixed number of the data, so as to attach, to the specified data, time information indicative of a time position of the specified data, and a step of, every predetermined second period longer than the first period, including a plurality of the data supplied during the period and the time information, if any, in a packet and transmitting the packet via a communication network. The operation and advantageous results of the data communication system are generally the same as described earlier in relation to section (c) of FIG. 1. Of course, the examples in sections (a) and (b) may also be considered only from the viewpoint of the communication system.

Preferred modes for carrying out the first embodiment of the present invention will further be described in detail hereinbelow, in relation to the example shown in section (c) of FIG. 1 which is considered to be the most preferable mode.

Figure 2:
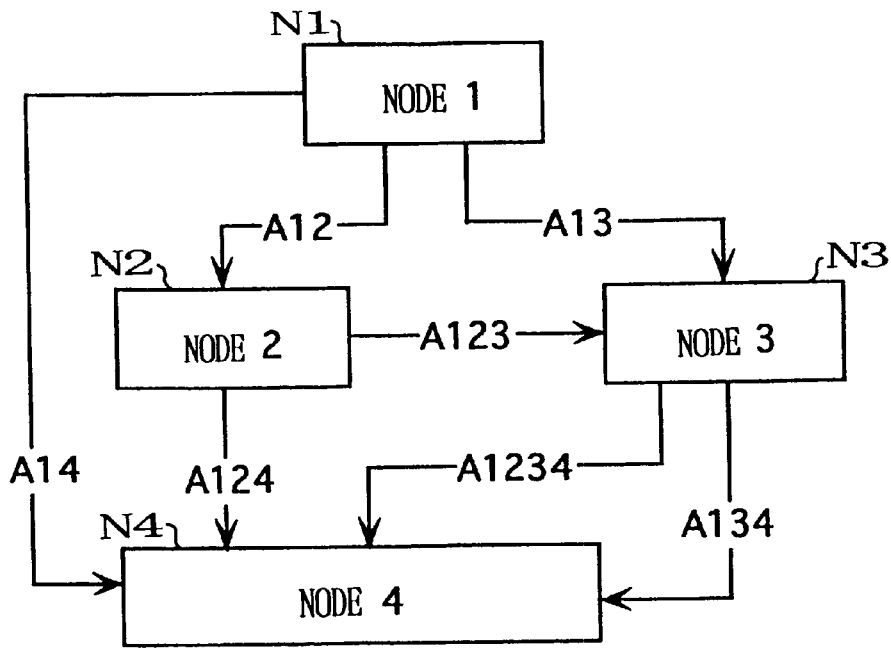
FIG. 2 is a block diagram illustrating a general configuration of one embodiment of the data communication method and system according to the present invention.

FIG. 2 is a block diagram illustrating a general configuration of one embodiment of the data communication system according to the present invention. At the transmitting-end unit 10, a data generator section 11 sequentially generates and outputs a plurality of data arranged in a time series of a predetermined sampling period T. For example, the data generator section 11 outputs sequential sample data of digital audio signals. To this end, the data generator section 11 may include an audio reproduction device such as a CD (Compact Disk) player, or a tone synthesizer device that synthesizes tone sample data on a real-time basis. The sampling period T of data output from the data generator section 11 may be optionally varied depending on a particular data source employed.

The data output from the data generator section 11 are temporarily stored into a data buffer 12 in the order of the time series. The data buffer 12 includes an asynchronous I/O buffer register. A timer 13 is provided for creating time stamp data, i.e., time information and may include a running counter or the like to count predetermined clock pulses. Every transmission interrupt period, a network processing section 14 executes a process for setting, in a transmission buffer TBF, a plurality "x" of data to form a packet on the basis of the data temporarily stored in the data buffer 12, a process for specifying one data, in each group composed of a predetermined number M of the data, so as to attach, to the specified data, time stamp data indicative of a time position of the specified data, and a process for transmitting the plurality "x" of data set in the transmission buffer TBF and the time stamp data attached to one of the data, together as a packet, to the receiving-end unit 20 via a communication network 30. The transmission interrupt period corresponds to the packet service section SF and is set to be longer than the data sampling period T so that the plurality "x" of data can be included in one packet; however, the number "x" of data in each packet is variable for the above-mentioned reasons.

At the receiving-end unit 20, the network processing section 24 receives each packet transmitted from the transmitting-end unit 10 via the communication network 30, and the plurality "x" of data included in the packet are temporarily stored into a data buffer 22 in the order of the time series of the data. Preferably, the data buffer 22 is an asynchronous I/O buffer register, such as a FIFO buffer, having a plurality of storage stages. A clock generator section 23, on the basis of time stamp data contained in the received packet, reproduces the original sampling period T of the data supplied from the data generator section 11 at the transmitting-end unit 10. For example, the clock generator section 23 estimatively determines the original sampling period T by executing the arithmetic operation of Equation 3 or the like, to thereby generate clock pulse signals corresponding to the determined period T. A data utilizing section 21 sequentially reads out and reproduces the data temporarily stored in the data buffer 22 in accordance with the reproduced sampling period T given from the clock generator section 23 and utilizes the read-out data for a desired purpose. The read-out data may be utilized in any desired manner; for example, they may be subjected to D/A (Digital-to-Analog) conversion so as to be audibly reproduced or sounded through a speaker with or without a tonal effect imparted thereto, or may be supplied to the outside after necessary processing.

The transmitting-and receiving-end units 10 and 20 are capable of controlling the operation of the above-mentioned individual sections and components by running software programs under the control of a microcomputer or the like. The following are exemplary operational flows for that purpose.

Figure 3:
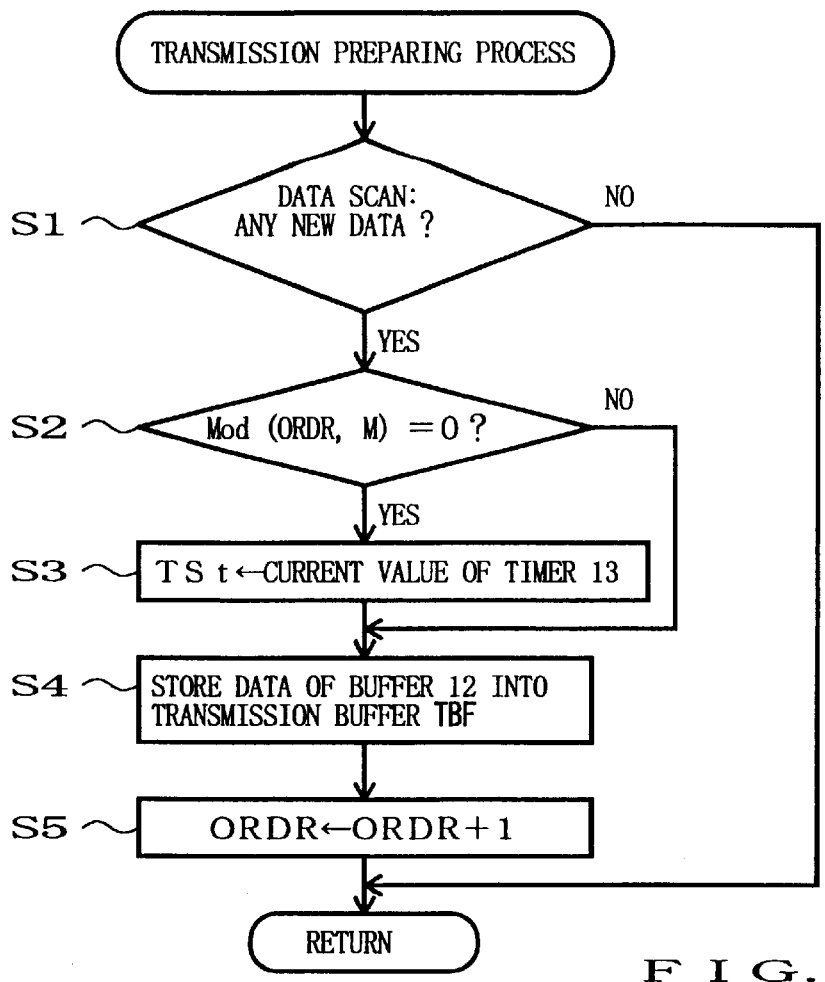
FIG. 3 is a flow chart showing an example of a "transmission preparing process" that is executed at a transmitting-end unit of FIG. 2.

FIG. 3 schematically shows an example of a "transmission preparing process" that is executed by the network processing section 14 during a main routine at the transmitting-end unit 10. The operations to be executed by the data generator section 11 and operations to input data to the data buffer 12 are not part of this transmission preparing process.

First, at step S1, the current stored content of the data buffer 12 is scanned to determine whether or not new data has been input to the data buffer 12. If new data has been input to the data buffer 12 as determined at step S1, an affirmative (YES) determination results, so that the control proceeds to step S2, but if not, the control returns to the main routine.

At step S2, the current stored content of an ordinal number register ORDER is divide by the predetermined number M, and it is examined whether or not the remainder from the division is "0". The ordinal number register ORDER is for storing data indicative of the ordinal number of the data that has been detected, at preceding step S1, as an input to the data buffer 12. The ordinal number register ORDER is initially set to an ordinal number "0" in an initialization process (not shown), and then, each time new data is input to the data buffer 12, it is incremented via an operation of step S5 as will be described below. The predetermined number M, as noted earlier, is a fixed number indicative of the number of data in a unit data group to which a single time stamp should be attached. The predetermined number M is preferably the power of 2, such as 4 or 8, because it will substantially simplify the necessary division operation.

If the remainder from the division of the content of the ordinal number register ORDER by the predetermined number M is "0", i.e., if an affirmative determination results at step S2, this means that the current data (i.e., the data having been input to the data buffer 12 just now) is one to which a time stamp should be attached.

So, if an affirmative determination is yielded at step S2, the control proceeds to step next S3 in order to store a current value of the timer 13 (which represents an approximate time when the one sample data from the data generator section 11 was input to the data buffer 12) into a transmitting-end time stamp register TSt, and then the control moves on to step S4.

This way, step S2 specifies one of the data to which a time stamp should be attached, and step S3 determines and generates time stamp data or time information to be attached to the specified data and stores the time information into the time stamp register TSt.

If, on the other hand, the remainder from the division of the stored value of the ordinal number register ORDER by the predetermined number M is not "0", i.e., if a negative (NO) determination results at step S2, the control jumps to step S4 without registering time stamp data.

At step S4, the new data input to the data buffer 12 (i.e., the current data corresponding to the stored content of the ordinal number register ORDER) is retrieved from the buffer 12 and stored into the predetermined transmission buffer TBF.

At following step S5, the value of the ordinal number register ORDER is incremented by one.

After step S5, the control returns to the main routine, during the course of which the transmission preparing process of FIG. 3 is again executed. By thus repeating the transmission preparing process of FIG. 3, a plurality of supplied data are sequentially stored into the transmission buffer TBF. Some (normally, the plurality "x") of the data thus stored in the transmission buffer TBF are then transmitted as a packet from the transmitting-end unit 10 via a transmission interrupt process as will be described below.

Figure 4:
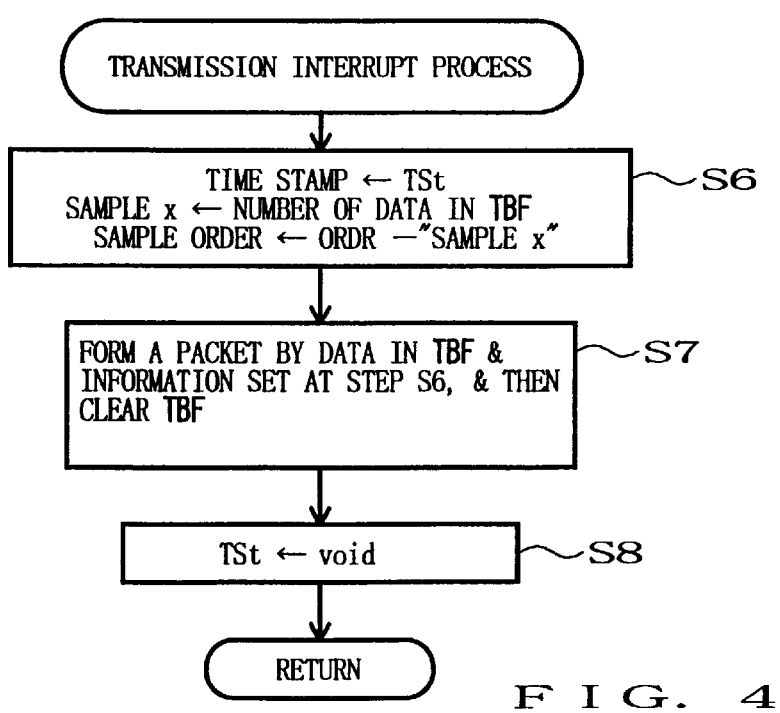
FIG. 4 is a flow chart showing an example of a transmission interrupt process that is carried out at the transmitting-end unit of FIG. 2.

FIG. 4 is a flow chart of the transmission interrupt process that is carried out at the transmitting-end unit 10 as an interrupt routine to the process of FIG. 3. The transmission interrupt process is executed at regular interrupt intervals according to a predetermined transmission interrupt period. For example, the predetermined transmission interrupt period corresponds to one packet service section SF and is generally longer than the sampling period T of data to be transmitted (transmission data) from the transmitting-end unit 10.

Upon issuance of a transmission interrupt signal, at step S6, the time stamp data registered in the time stamp register TSt is set as time stamp information "TIME STAMP" in readiness for transmission; the number "x" of the data stored in the transmission buffer TBF is set as the number x of sample "SAMPLE x" in readiness for transmission; and also a value obtained by subtracting the number x of sample "SAMPLE x" from the value of the ordinal number register ORDER (i.e., ORDER–"SAMPLE x") is set as an ordinal number of the packet head sample "SAMPLE ORDER" in readiness for transmission. The ordinal number of the packet head sample "SAMPLE ORDER" is a sample ordinal number of the head or first data in the time series data contained in the packet to be transmitted from the transmitting-end unit 10. Because the current stored content of the ordinal number register ORDR indicates an ordinal number next to that of the last data in the plurality of the data contained in a packet to be transmitted from the transmitting-end unit 10, a value obtained by subtracting the number x of sample "SAMPLE x" from the value of the ordinal number ORDR represents a sample ordinal number of the head data in the packet.

Next step S7 forms a packet comprising the plurality "x" of data stored in the transmission buffer TBF and various information previously set at preceding step S6, i.e., the time stamp information "TIME STAMP", number x of sample "SAMPLE x" and ordinal number of the packet head sample "SAMPLE ORDER", and it transmits the thus-formed packet via the communication network 30. Actual communication between the transmitting-end unit 10 and receiving-end unit 20 via the communication network 30 is effected through communication interfaces (not shown), and hence the packet is sent to the interface at step S7. Assume here that the transmission buffer TBF is cleared after the stored data in the buffer TBF are sent out from the transmitting-end unit 10.

Empty data "void" is set into the transmitting-end time stamp register TSt at step S8, and the control returns. If a next packet includes a valid time stamp, then the value of the time stamp register TSt is renewed by that valid time stamp value by way of step S3 of FIG. 3. If, on the other hand, the next packet does not include a valid time stamp, the control does not take step S3 so that a next execution of the transmission interrupt process occurs with the register TSt holding the empty data "void" in stead of being renewed. In this case, the empty data "void" is set as the time stamp information "TIME STAMP" at step S6 of FIG. 4 in readiness for transmission.

Now, with reference to the first and second rows in section (c) of FIG. 1, a description will be made about detailed example of the operational flows of FIGS. 3 and 4 in relation to a case where the predetermined number M is set at "4".

Because the stored value of the ordinal number register ORDR is "0" when data denoted by ordinal number "0" is input to the data buffer 12, an affirmative determination results at step S2, so that the control proceeds to step S3 in order to store a current value (the value is shown as "1" in FIG. 1 for convenience of explanation, but it may of course be any other value) of the timer 13 into the transmitting-end time stamp register TSt. The data of this ordinal number "0" is stored into the transmission buffer TBF at step S4, and the ordinal number register ORDR is incremented to a value "1" at step S5.

When next data denoted by ordinal number "1" is input to the data buffer 12, a negative determination results at step S2 because the stored value in the register ORDR is "1", the control jumps over step S3 to execute the operations of steps S4 and S5 so that the data denoted by ordinal number "1" is stored into the transmission buffer TBF and the ordinal number register ORDR is incremented to a value "2".

Similarly, when next data denoted by ordinal number "2" is input to the data buffer 12, the control jumps over step S3 to execute the operations of steps S4 and S5 so that the data denoted by ordinal number "2" is stored into the transmission buffer TBF and the ordinal number register ORDR is incremented to a value "3".

This way, in the first service section SF1, three data denoted by ordinal numbers "0", "1" and "2" are supplied to the transmitting-end unit 10 for storage in the transmission buffer TBF. Following this, at the end of the first service section SF1 or at the beginning of the next service section SF2, the transmission interrupt process of FIG. 4 is executed. Then, through the operation of step S6, the value "1" stored in the register TSt is set as the time stamp information "TIME STAMP", "3" is set as the number x of sample "SAMPLE x" and "0" (3–3=0) is set as the ordinal number of the packet head sample "SAMPLE ORDR", in readiness for transmission. After this, through the operation of step S7, the thus-set information and three data denoted by ordinal numbers "0", "1" and "2" stored in the transmission buffer TBF are transmitted together as a packet from the transmitting-end unit 10 at an optionally selected point in the second service section SF2.

In the second service section SF2, two data denoted by ordinal numbers "3" and "4" are supplied to the transmitting-end unit 10. When the data denoted by ordinal number "3" is supplied, a negative determination results at step S2, so that the data denoted by ordinal number "3" is stored into the transmission buffer TBF at step S4 and the ordinal number register ORDR is incremented to a value "4" at step S5. When the data denoted by ordinal number "4" is supplied, an affirmative determination results at step S2, so that the control goes to step S3 in order to store a current value of the timer 13 ("17" in the illustrated example of FIG. 1) into the transmitting-end time stamp register TSt. Also, the data denoted by ordinal number "4" is stored into the transmission buffer TBF at step S4 and the ordinal number register ORDR is incremented to a value "5" at step S5.

The transmission interrupt process of FIG. 4 is executed after the second service section SF2. First, through the operation of step S6, the value "17" stored in the register TSt is set as the time stamp information "TIME STAMP", "2" is set as the number of sample "SAMPLE x" and "3" (5–2=3) is set as the ordinal number of the packet head sample "SAMPLE ORDR", in readiness for transmission. After this, through the operation of step S7, the thus-set information and three data denoted by ordinal numbers "3" and "4" stored in the transmission buffer TBF are transmitted together as a packet from the transmitting-end unit 10 at an optionally-selected point in the second service section SF2. Also, empty data "void" is set into the register TSt at step S8.

In the third service section SF3, two data denoted by ordinal numbers "5" and "6" are supplied to the transmitting-end unit 10. When the data denoted by ordinal number "5" is supplied, a negative determination results at step S2, so that the data denoted by ordinal number "5" is stored into the transmission buffer TBF at step S4 and the ordinal number register ORDR is incremented to a value "6" at step S5. Similarly, when the data denoted by ordinal number "6" is supplied, a negative determination results at step S2, so that the data denoted by ordinal number "6" is stored into the transmission buffer TBF at step S4 and the ordinal number register ORDR is incremented to a value "7" at step S5. In this third service section SF3, the transmitting-end time stamp register TSt keeps holding the empty data "void" because the control does not take step S3.

Thus, in a next execution of the transmission interrupt process, the empty data "void" is set as the time stamp information "TIME STAMP", "2" is set as the number x of sample "SAMPLE x" and "5" (7−2=5) is set as the ordinal number of the packet head sample "SAMPLE ORDR", in readiness for transmission. After this, the thus-set information and two data denoted by ordinal numbers "5" and "6" stored in the transmission buffer TBF are transmitted together as a packet from the transmitting-end unit 10.

Then, packets having contents as shown on the second row in section (c) of FIG. 1 will be transmitted from the transmitting-end unit 10, in accordance with the time series data noted on the first row, in the manner as described above.

Figure 5:
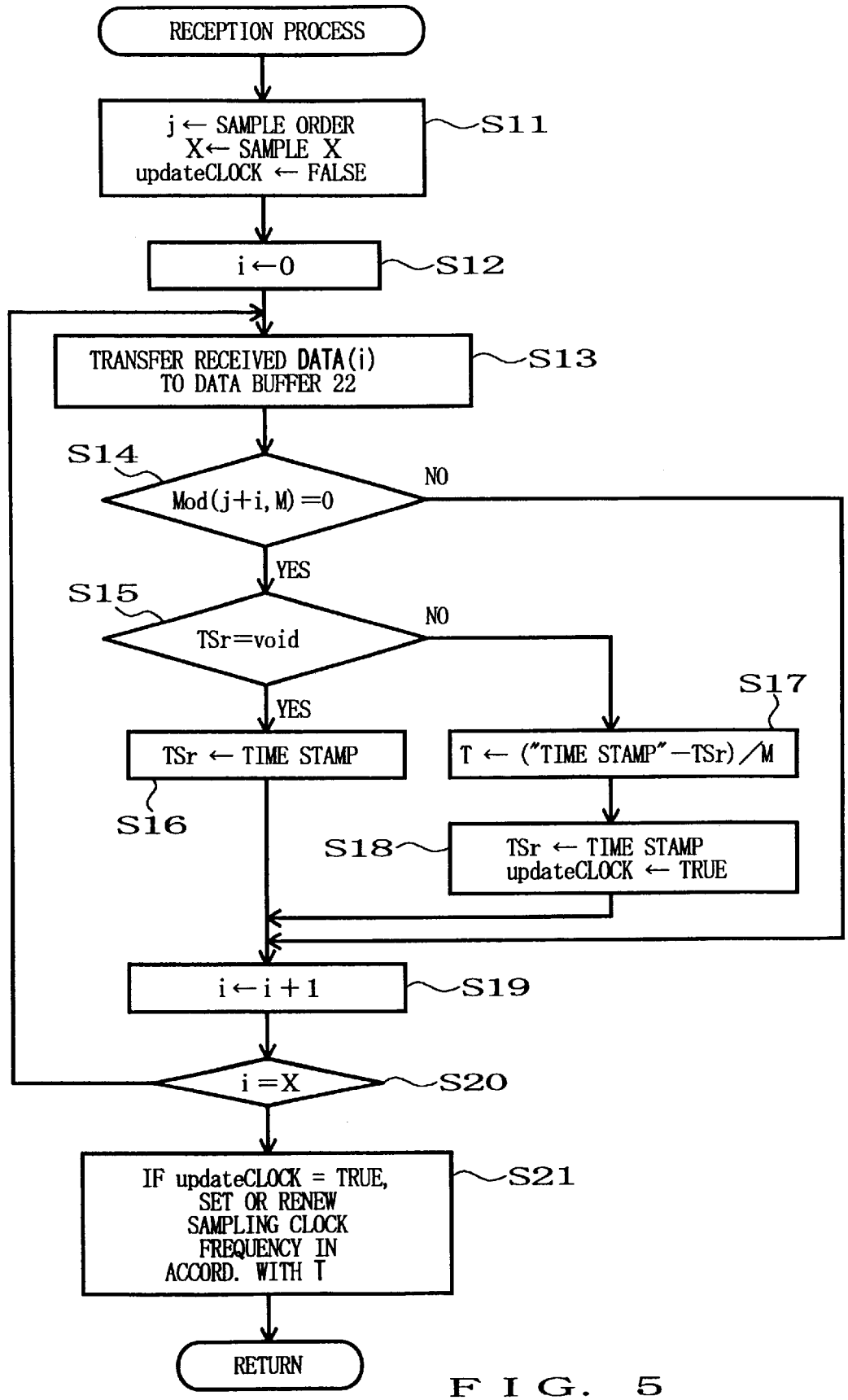
FIG. 5 is a flow chart showing an example of a reception process carried out at a receiving-end unit of FIG. 2.

FIG. 5 is a flow chart of an example of a reception process carried out at the receiving-end unit 20. The reception process is illustrated as being carried out primarily by the network processing section 24 and clock generator section 23.

This reception process is executed each time the receiving end 20 receives a packet sent via a communication network 30.

First, step S11 stores the ordinal number of the packet head sample "SAMPLE ORDR" and number x of samples, contained in the packet received from the transmitting-end unit 10 via the communication network 30, into registers j and X, respectively. Also, at step S11, a false value FALSE is set into an update clock register updateCLOCK. When a true value TRUE is set in the update clock register updateCLOCK, renewal of the clock frequency is instructed, while when a false value FALSE is set in the update clock register updateCLOCK, renewal of the clock frequency is not instructed.

At next step S12, an initial value "0" is set into a variable register i.

Then, step S13 transfers, to the data buffer 22, one of the plurality "x" of the data contained in the received packet which is designated by the variable register i (DATA(i)).

At following step S14, the sum of the current stored value of register j (i.e., the ordinal number of the packet head sample "SAMPLE ORDR") and current stored value of the variable register i is divided by the above-mentioned predetermined number M, and a determination is made as to whether or not the remainder from the division of the stored value of the ordinal number register ORDR by the predetermined number M is "0", i.e., whether or not the data written into the data buffer 22 at preceding step S13 (i.e., the data denoted by ordinal number "j+i") is the one having a time stamp attached thereto. If the data written into the data buffer 22 is the one having a time stamp attached thereto, the remainder is "0" because the ordinal number "j+i" is an aliquot factor of the predetermined number M, so that an affirmative determination result at step S14. In this case, the control goes to step S19 by way of steps S15 to S18. If a negative determination results at step S14, the control jumps over steps S15 to S18 to step S19.

At step S15, a determination is made as to whether or not the stored content of a receiving-end time stamp register TSr is empty data "void". The receiving-end time stamp register TSr is initially set to store empty data "void" by an initialization process (not shown), and thereafter the time stamp information "TIME STAMP" contained in the received packet is loaded into the register TSr by execution of following step S16. Step S16 is for loading the first time stamp information "TIME STAMP" into the receiving-end time stamp register TSr. Following this, a negative determination results at step S15, so that the control takes the path through steps S17 and S18.

At step S17, an arithmetic operation corresponding to Equation 3 above is executed to estimatively determine the original sampling period T. Namely, at this step, the current stored value of the receiving-end time stamp register TSr (which is the time stamp information contained in the last or last-but-one received packet and corresponding to "TS($i-i'$)" of Equation 3) is subtracted from the time stamp information "TIME STAMP" contained in the current received packet (corresponding to "TS($i$)" of Equation 3), and the subtraction result is divided by the fixed number M indicative of the number of data (e.g., four) in the data group to which one time stamp is to be attached. Then, the resultant quotient is registered as data indicative of an estimate of the original sampling period T.

At next step S18, the time stamp information "TIME STAMP" contained in the current received packet is loaded into the receiving-end time stamp register TSr to thereby renew the stored value of the register TSr, and also a true value TRUE is set into the update clock register updateCLOCK.

At step S19, the value of the variable register i is incremented by one. At next step S20, a determination is made as to whether or not the incremented value of the variable register i has become equal to the number "x" of the data in the packet currently stored in register X. With a negative answer, the control loops back to step S13 in order to repeat the above-mentioned operations of steps S13 to S18 for the increment value of the variable register i.

Once the determination has become affirmative at step S20, the control proceeds to step S21, where a clock synchronization process is executed to set a sampling clock frequency for the receiving-end unit 20 in accordance with the estimatively determined original sampling period T at preceding step S17 as long as the set value of the update clock register updateCLOCK is a true value TRUE. That is, at step S21, a sampling clock frequency for the receiving-end unit 20 is set or renewed in accordance with the calculation result T at step S17. Following this, the control terminates the reception process. Note that because only one time information is included in each packet in accordance with the present invention, there is no need to repeat the operations of steps S13 to S20 once the control has taken the path through steps S17 and S18. Therefore, the operational flow may be modified in such a manner that the control jumps to step S21 from step S18.

Next, with reference to the second and third rows in section (c) of FIG. 1, a description will be made about a detailed example of the operational flow of FIG. 5 in relation to a case where the predetermined number M is set to "4".

When the first packet including the data denoted by ordinal numbers "0", "1" and "2" is received in the second service section SF2, the registers j and X are set to "0" and "3", respectively, at step S11. In this case, an affirmative determination results at step S14 when the registers j and i have both been set at a value "0". Because empty data "void" has been set in the receiving-end time stamp register TSr, an affirmative determination is yielded at following step S15, so that the time stamp information "TIME STAMP" (=1) contained in the current received packet is set into the register TSr at step S16. Then, after repeating the operations of steps S13 to S20, the control proceeds to step S21. In this case, the operation for setting the sampling clock frequency for the receiving-end unit 20 is not effected because the update clock register updateCLOCK still remains set at the false value FALSE. Accordingly, reproductive readout of the data stored in the data buffer 22 has not started yet.

When the second packet including the data denoted by ordinal numbers "3" and "4" is received in the third service section SF3, the registers j and X are set to values "3" and "2", respectively, at step S11. In this case, an affirmative determination results at step S14 when the registers j and i have been set at "3" and "1", respectively. Because the time stamp information "TIME STAMP" contained in the last received packet (which is "1") has been set in the receiving-end time stamp register TSr. a negative determination is yielded at following step S15, so that the control branches to step S17. In this case, the time stamp information "TIME STAMP" contained in the current received packet is "17", and hence the arithmetic operation of step S17 yields T=(17−1)/4 =4. At next step S18, the time stamp information "TIME STAMP" indicating the value "17" is set into the receiving-end time stamp register TSr, and a true value TRUE is set into the update clock register updateCLOCK. Thus, subsequent step S21 sets a sampling clock frequency for the receiving-end unit 20 in accordance with the above-mentioned period T. This permits reproductive readout of the data stored in the data buffer 22. The section (c) example of FIG. 1 is shown as allowing the data readout according to the period T to be started at the beginning of the next service section SF4. However, in an alternative, the reproductive readout of the data stored in the data buffer 22 may be started immediately after the operation of step S21 is completed, even in the middle of the service section SF3.

Further, when the third packet including the data denoted by ordinal numbers "5" and "6" is received in the fourth service section SF4, the registers j and X are set to values "5" and "2", respectively, at step S11. In this case, the variable register i is first set to "0" and then to "1". Thus, step S14 makes a determination for two values: J+i=5+0=5; and J+i=5+1=6, and the determination becomes negative for each of the two values, so that the control does not take the path through steps S17 and S18. Accordingly, the arithmetic operation of step S17 to determine the original period T is skipped, and thus the time stamp information "TIME STAMP" of value "17" contained in the last received packet remains set in the receiving-end time stamp register TSr. Consequently, the sampling clock frequency renewal of step S21 is also skipped so that the reproductive readout of the data stored in the data buffer 22 is continued as before with the clock frequency according to the last determined period T. This way, whenever the time stamp information "TIME STAMP" of contained in the packet is empty data "void", the sampling clock frequency renewal of step S21 is not carried out.

Then, when the fourth packet including the data denoted by ordinal numbers "7" and "8" is received in the fifth service section SF5, the registers j and X are set to values "7" and "2", respectively, at step S11. In this case as well, the variable register i is first set to "0" and then to "1". Step S14 yields an affirmative determination when j+i=7+1=8. Then, the control goes to step S17, where an arithmetic operation of T=(33−17)/4=4 is executed using the time stamp information "TIME STAMP" of value "33" contained in the current received packet and the time stamp information "TIME STAMP" of value "17" of the last-but-one packet stored in the receiving-end time stamp register TSr. At next step S18S the time stamp information "TIME STAMP" of value "33" contained in the current received packet is set into the receiving-end time stamp register TSr, and a true value TRUE is set into the update clock register updateCLOCK.

Thus, subsequent step S21 renews the sampling clock frequency for the receiving-end unit 20 in accordance with the above-mentioned period T.

Thereafter, similar operations take place, so that the reproductive readout of the time series data with the original period T as shown on the third row of section (c) of FIG. 1 continues to be executed in response to each received packet of the content as shown on the second row of section (c).

The arithmetically determined period T has been described above as being of fixed value "4" because the time stamp information is expressed in a simplified value for convenience of explanation; however, normally, the period T may take a much more complicated value depending on the resolution set for the individual values. The receiving-end unit 20 is subjected to synchronizing control such that its sampling clock frequency is constantly adjusted in accordance with the arithmetically determined period T. Thus, in response to the time stamp information transmitted for each predetermined data group, control is effected such that the sampling clocks of the transmitting-end unit 10 and receiving-end unit 20 are in constant synchronism with each other.

In the above-described embodiment, it is desirable that the predetermined fixed number M be of such a value that does not allow a time stamp to be attached to two or more data within one packet-forming period (i.e., one service section SF), namely a value that is greater than the maximum number of data (three data in the illustrated examples of FIG. 1) supplied within one packet forming period. In particular, a smallest value in such a value range is most desirable in order to increase the reproductive resolution of the sampling period T at the receiving-end unit 20. It is also desirable to set the predetermined fixed number M to the power of 2 because such a value can effectively simplify the necessary dividing calculation.

In a simplest form to achieve synchronization between the sampling clocks at the transmitting- and receiving-end units, it should be sufficient that information instructing a sampling frequency be supplied from the transmitting-end unit to the receiving-end unit at the outset of data transmission and a clock frequency division ratio is set to allow the receiving-end unit to produce a sampling frequency corresponding to the sampling frequency instructing information. However, the reproduction process lasting for a long time tends to encounter various inconveniences because subtle differences could occur between the actual sampling frequencies at the transmitting- and receiving-end units due to different individualities of quartz crystal oscillators used as oscillating sources. Namely, in the data readout techniques based on the clock oscillator output, where the oscillator output is frequency-divided to produce sampling clock pulses of a desired period, subtle differences could occur between the actual sampling frequencies at the transmitting and receiving-end units due to a difference between individualities of the quartz crystal oscillator used for data readout at the transmitting-end unit and the quartz crystal oscillator used for data readout at the receiving-end unit even when a same frequency division ratio is employed at the two end units. Such subtle differences would gradually accumulate, in a long-lasting continuous audio data reproduction, eventually leading to a great difference in reproduction timing.

For example, in cases where information is exchanged between different systems, it has been conventional to accommodate a difference in data transmission timing by just providing a buffer at the receiving-end unit. With the conventional technique, the presence of a subtle difference between the sampling clock frequencies at the transmitting and receiving-end units would sometimes lead to an overflow of the receiving-end buffer (when the receiving-end clock frequency has become relatively low) or an underflow of the receiving-end buffer (when the receiving-end clock frequency has become relatively high); such an overflow or underflow is undesirable because it prevents appropriate data transmission and reception. In contrast, the present invention, employing the system where the clocks at the transmitting and receiving-end units are constantly controlled to synchronize with each other by attaching time information to data to be transmitted, can reliably avoid such a problem and hence is more preferable.

Whereas in the above-described embodiment, the sampling clock frequency for controlling reproductive readout from the data buffer 22 is set at the receiving-end unit 20 on the basis of the period T arithmetically determined at step S17, the form of controlling the reproductive readout on the basis of time information may be modified, as necessary, without being constrained to the above-mentioned. For example, unique time information may be attached to each data having no time stamp information attached thereto so that the reproductive readout is conducted with reference to the unique time information.

In addition, data indicative of a fundamental sampling period T may be transmitted prior to data transmission so that the receiving-end unit 20 starts the reproductive data readout with the sampling period T corresponding to the transmitted data. By so doing, the start of the reproductive data readout at the receiving-end unit 20 can be made earlier, than that in the above-described embodiment, by a time corresponding to one service section.

In another modification, several dummy data may be transmitted along with an initial time stamp value prior to transmission of actual data. In this case, the reproductive data readout is caused to start with the actual data by skipping the dummy data. Assuming that the data denoted by ordinal numbers "0", "1" and "2" are dummy data in the section (c) example, the reproductive readout at the receiving-end unit shown on the third row is caused to start with the data denoted by ordinal number 3 (the head data of the actual data group). Even in this case, the start of the reproductive data readout at the receiving-end unit 20 can be made earlier, than in the above-described embodiment, by a time corresponding to one service section.

Note that if the data communication system as shown in section (b) of FIG. 1 is executed, modifications may be made in most cases such that steps S2 and S3 in FIG. 3 are omitted, a current value of the timer 13, rather than a current stored value of the register TSt, is set as time stamp information "TIME STAMP" at step S6 of FIG. 4 and a variable number "x" (stored value of register X) is used in place of the predetermined number M at steps S14 and S17 of FIG. 5.

Further, if the data communication system as shown in section (a) of FIG. 1 is executed, modifications may be made in most cases such that a fixed number N indicative of the number of data per packet is used in place of the predetermined number M at step S2 of FIG. 3 and steps S14 and S17 of FIG. 5 and an additional step is executed at the beginning of the transmission interrupt process to determine whether the number "x" of data in the transmission buffer TBF is equal to or greater than the number N. In this case, the transmission interrupt process is terminated if answered in the negative at the additional step, but continues to be executed if answered in the affirmative at the additional step. When the execution of the transmission interrupt process should continue, the predetermined number N is set at step S6 as the number of sample "SAMPLE x" in readiness for transmission, and the first N data of those stored in the transmission buffer TBF are formed as a packet at step S7 with any remaining data left stored in the buffer TBF.

FIG. 6 is a block diagram illustrating a hardware structure of a device, such as a personal computer, that can be suitably used either as the transmitting-end unit or as the receiving-end unit.

In the system of FIG. 6, a CPU (Central Processing Unit) 31 is used as a main control section, under the control of which are executed transmission processing programs as shown in FIGS. 3 and 4 and a reception processing program as shown in FIG. 5. To the CPU 31 are connected, via a data and address bus 44, a ROM (Read-Only Memory) 32, a RAM (Random Access Memory) 33, a communication network I/O (Input/Output device) 34, a timer 35, a mouse 36, a keyboard , a display 38 a hard disk 39, a DMAC (Direct Memory Access Controller) 40, a sound I/O (Input/Output device) 41, a sampling clock generator circuit 42, an external memory drive 43, etc.

The sound I/O 41 is a sound input/output device commonly called a "CODEC", which contains a digital-to-analog converter (DAC), an analog-to-digital converter (ADC), an input FIFO (First-In-First-Out) buffer connected with the ADC, an output FIFO buffer connected with the DAC, etc. Analog audio signal is supplied via an external audio signal input terminal 45 to the ADC in the sound I/O 41, so that the supplied audio signal is converted to a digital audio signal in response to a sampling clock pulse of a predetermined frequency generated from the sampling clock generator circuit 42 and then fed to the input FIFO buffer. When data is present in the input FIFO buffer, a signal requesting execution of a sound recording process is output to the DMAC 40. The DMAC 40 receives the analog audio data from the input FIFO buffer in response to the sound recording process request from the sound I/O 41 and delivers the analog audio data via the bus 44 to the internal memory, such as the RAM 33, for storage therein.

An external recording medium 46, such as a floppy disk, CD-ROM (Compact Disk Read-Only Memory) or MO (Magneto-Optical Disk), is removably attached to the external memory drive 43 for data read/write by the drive 43. Such an external recording medium 46 may be used to store therein control programs as shown in FIGS. 3 to 5 and other programs, or to store audio data and the like. For example, the external recording medium 46 storing audio data to be transmitted is set in the external memory drive 43 so that the drive 43 reads out the audio data from the recording medium 46 to then deliver the read-out data via the bus 44 to the internal memory, such as the RAM 33, for storage therein.

Where the system of FIG. 6 is arranged to function as the transmitting-end unit 10, the CPU 31 executes the transmission processing programs as shown in FIGS. 3 and 4 and transmits the audio data stored in the RAM 33 to the communication network 30 (FIG. 2) via the communication network I/O 34.

On the other hand, where the system of FIG. 6 is arranged to function as the receiving-end unit 20, the CPU 31 executes the reception processing programs as shown in FIG. 5 and receives the audio data delivered via the communication network I/O 34 and communication network 30 (FIG. 2) to store the received data into the internal memory such as the RAM 33. Also, a frequency of clock pulses generated by the sampling clock generator 42 is variably set in accordance with the sampling clock frequency of the received data. The received audio data stored in the RAM 33 may be preserved in the hard disk 39 or on the external recording medium 46 or read out under the control of the DMAC 40 for sounding through the sound system 47. In such a case, the DMAC 40 reads out the audio data stored in the RAM 33 through the output buffer, sample by sample, in accordance with the direct memory access scheme in synchronism with reproduction sampling clock pulses from the sound I/O 41. The sound I/O 41 writes the audio data into its internal output FIFO buffer and then reads out the data from the output FIFO buffer in accordance with the sampling clock pulses to transfer the read-out data to the DAC for digital-to-analog conversion. The resultant converted waveform data are then supplied to the sound system 47 for audible reproduction or sounding therethrough.

The transmission and reception processing programs of the present invention as shown in FIGS. 3 to 5 may be stored in any of the ROM 32, RAM 33, hard disk 39 and external recording medium 46.

Further, the system of FIG. 6 may be connected via the communication network I/O 34 to the communication network so that it can receive the transmission or reception processing program from an external server computer (not shown) and transfer the received program to the RAM 33 or hard disk 39 for storage therein.

With the first embodiment arranged in the above-described manner, an improved data communication system is provided which is suitable for use in applications where a plurality of data, such as digital audio data, arranged in a time series of a predetermined period are transmitted from a transmitting-end unit via a communication network, and which, while allowing users to enjoy the benefits of an asynchronous packet communication, can effectively reduce a total quantity of transmitted data per packet by expressing time information for the packet in minimized data quantity.

The first embodiment also provides an improved data communication system which can minimize time delays that would be caused in data transmission between a transmitting-end unit and a receiving-end unit receives. Further, in this case, an arithmetic operation necessary for the receiving-end unit to reproduce the time information can be simplified to a substantial degree.

Now, a second embodiment of the present invention will be described.

Figure 7:
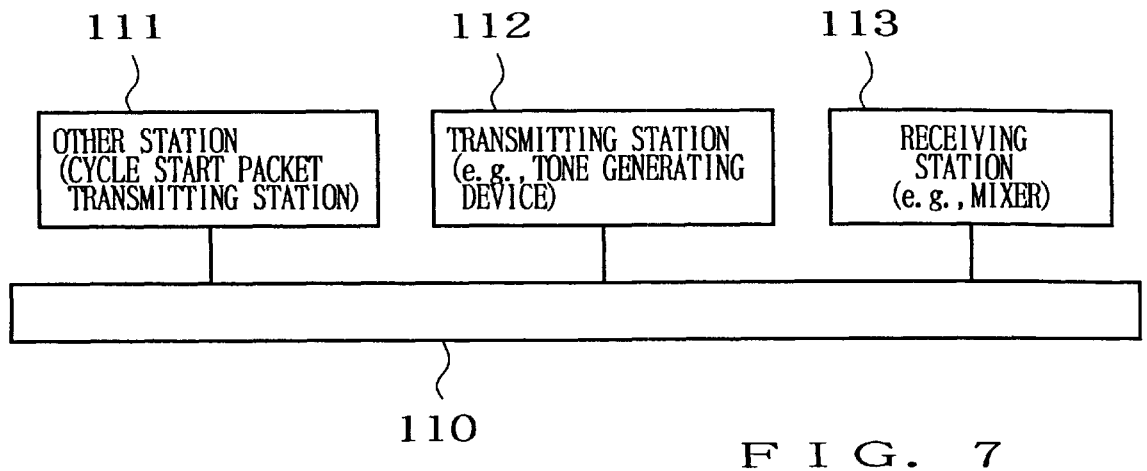
FIG. 7 is a block diagram outlining an exemplary organization of a data communication system in accordance with a second embodiment of the present invention.
Figure 8:
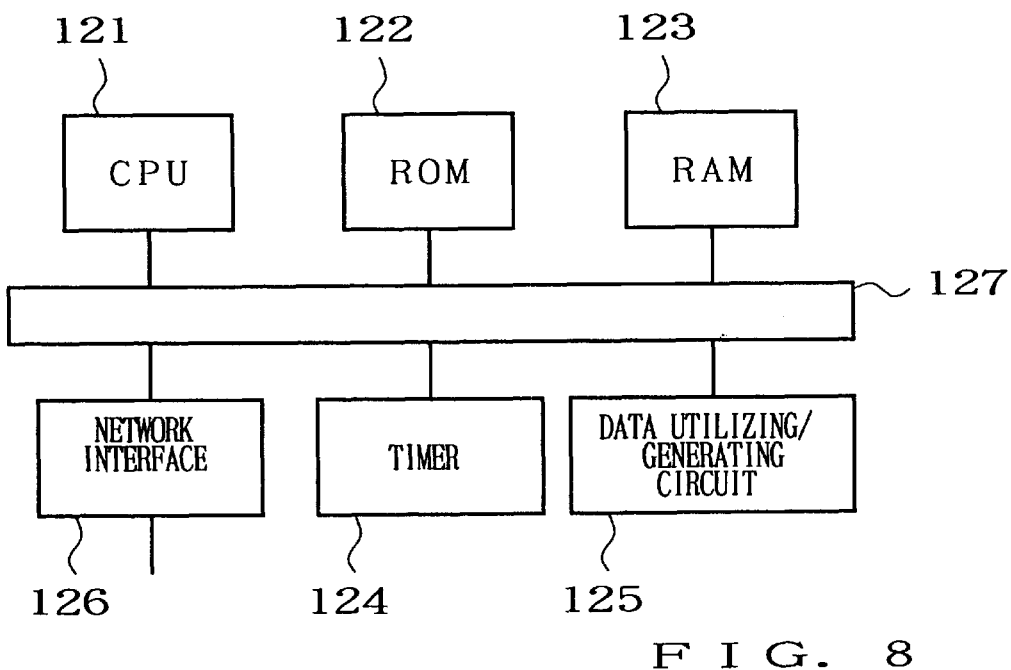
FIG. 8 is a block diagram outlining an exemplary inner structure of each station or node in the data communication system of FIG. 7.
Figure 25:
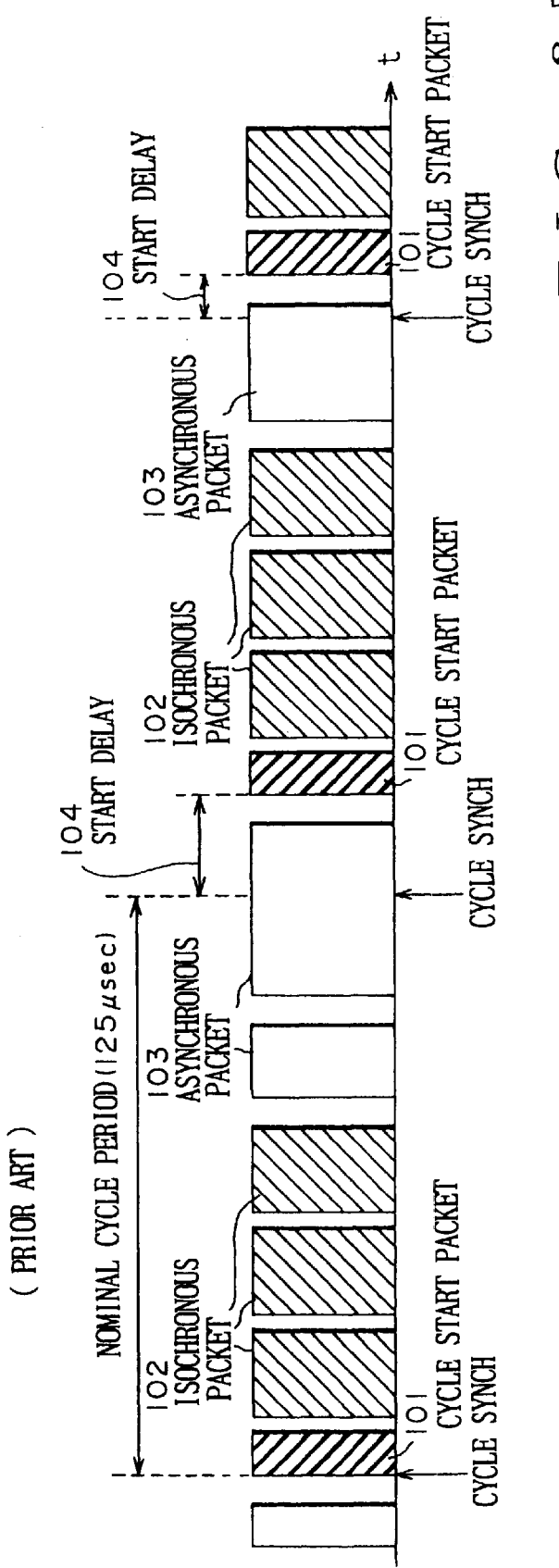
FIG. 25 is a diagram explanatory of an example of a traditional packet on a communication network.

FIG. 7 is a block diagram outlining an exemplary organization of a data communication system of in accordance with the second embodiment of the present invention. In FIG. 7, reference numeral 110 represents the communication network that is capable of the isochronous data transfer as described earlier in relation FIG. 25. Further, reference numeral 111 to 113 represent examples of nodes connected to the network, of which the node 112 is a transmitting station for transmitting time-serial data to be reproduced on the time axis, such as a tone source sending out tone waveform signals. The node 113 is a receiving station for receiving the above mentioned time-serial data, such as a mixer that mixes together the tone waveform signals. More specifically, time-serial data, such as tone waveform data, sampled at predetermined sampling timing are transmitted from the transmitting station, along with time stamps attached thereto. Then, the receiving station 113 receives and reproduces the transmitted tone waveform data at timing specified by the time stamps. Note that a plurality of other nodes are also connected to the communication network 110, one of the other nodes 111 is designated to function as the above-mentioned cycle master (i.e., cycle-start packet transmitting station). structure of each of the nodes 111 to 113. In FIG. 8, reference numeral 121 represents a central processing unit (CPU), 122 a ROM having prestored therein operating programs and various data, 123 a RAM for use as working areas and the like, 124 a timer containing the above-mentioned cycle timer register and capable of generating a variety of timing signals, 126 a network interface circuit for connection with the network 110, and 127 an internal bus. Further, reference numeral 125 represents a data utilizing/generating circuit, which is caused to function as the data generating circuit when the node in question is the transmitting station 112 but caused to function as the data utilizing circuit when the node in question is the receiving station 113.

FIGS. 9A and 9B are functional block diagrams explanatory of data transfer operations carried out in the transmitting station 112 and receiving station 113.

Specifically, FIG. 9A is a block diagram explanatory of behavior of the transmitting station 112, where reference numeral 131 represents a data generating circuit that, every basic period of 125 μsec, generates an isochronous-channel transmission packet on the basis of a plurality of tone sample data sampled with a predetermined sampling frequency and a time stamp attached to the tone sample data. Reference numeral 132 represents a data buffer for storing each packet produced by the data generating circuit 131, and 133 a FIFO (First-In-First-Out)-type wait buffer into which the packet temporarily stored in the data buffer 132 is written in response to an output (cycle timer output) from the cycle timer register indicative of the above-mentioned first timing. Further, reference numeral 134 represents a transmission buffer for storing the packet read out from the wait buffer 133 in response to a cycle start signal that is generated upon reception of a cycle start packet indicative of a start of a new transmission cycle. The packet thus stored in the transmission buffer 134 is sent out to the communication network 110 at timing designated for the isochronous channel in question.

Further, FIG. 9B is a block diagram explanatory of behavior of the receiving station 113, where reference numeral 135 represents a reception buffer for storing each of the packets sent out to the communication network which is to be received by the receiving station 113, and 136 a FIFO-type wait buffer into which the packet temporarily stored in the reception buffer 135 is written in response to the cycle start signal. Reference numeral 137 represents a data buffer into which the packet stored in the wait buffer 136 is written in response to the output from the cycle timer register indicative of the above-mentioned first timing, and 138 represents a data utilizing circuit that reproduces the data of the packet from the data buffer 137 at timing specified by the time stamp.

In the above-mentioned manner, the transmitting end generates a data packet in accordance with the first timing and transmits it to the communication network in response to the cycle start signal (second timing), and the receiving end receives the transmitted packet on the basis of the second timing and reproduces the data on the basis of the first timing.

Figure 10A:
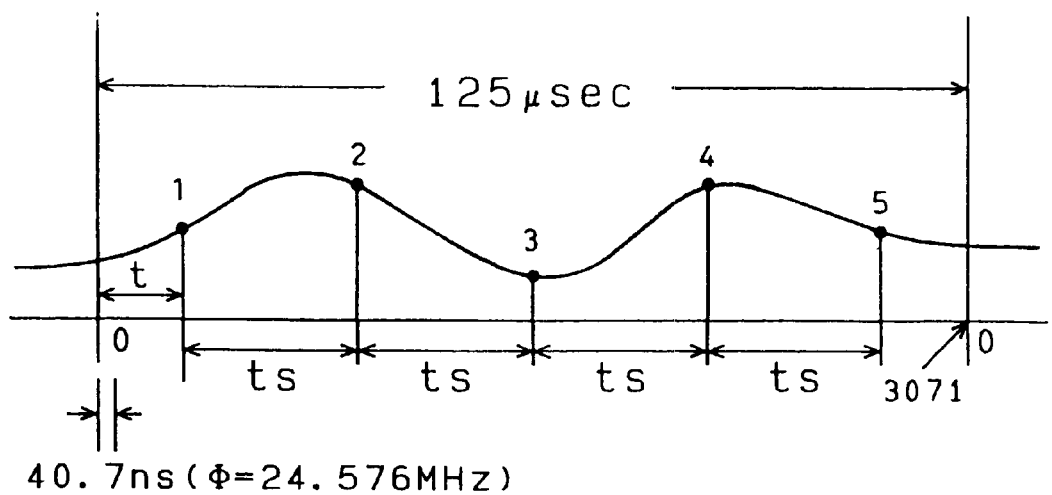
FIG. 10A is a diagram explanatory of an example of a transmission packet in a time-serial fashion.
Figure 10B:
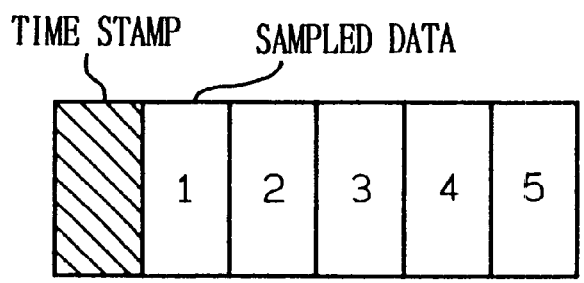
FIG. 10B is a diagram showing an exemplary data format of a packet in accordance with the present invention.

FIGS. 10A and 10B are diagram explanatory of a transmission packet produced by the data generating circuit 131. Specifically, FIG. 10A is explanatory of data to be transmitted (transmission data), which are, for example, five discrete data "1" to "5" obtained by sampling a continuous signal, such as a tone waveform signal, at predetermined sampling intervals ts—in this case ts=25 (=125/25) μsec. The first sampled data "1" is one sampled at a time point that is later than the first timing signal by a time t, and the remaining sampled data "2" to "5" are data sampled later than the time point t by amounts equal to respective multiples of time value ts.

Further, in this bus system, the basic clock frequency Φ is set to 24.576 MHz (i.e., a 40.7-nanosecond clock period), and thus any time position in one reference cycle (125 μsec.) can be expressed by the clock cycles; that is, any time position in one reference cycle can be expressed by a specific number of system clock pulses in the range of "0" "3071".

Thus, in the present invention, the time position t of the first sampled data within the corresponding reference cycle, which is expressed using the number of the clock cycles, is used as a value of the time stamp, and respective reproduction timing of the other sampled data "2" to "5" is determined by sequentially adding the sampling interval ts to the time position of the first sampled data.

In FIG. 10B, there is shown an organization of a packet in which such data are transmitted. As shown, the transmission packet comprises a combination of the time stamp provided at the beginning of the packet to indicate a time position t of the first sampled data in the packet and the first to fifth sampled data following the time stamp. Because the time stamp is expressed by a specific number of the system clock pulses in the range of "0" to "3071" clock cycles as note earlier, it is provided as 12-bit data.

Figure 10C:
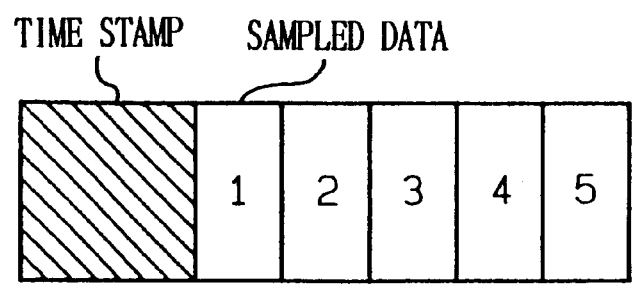
FIG. 10C is a diagram showing an exemplary data format of a packet employed in prior art.

For the purpose of comparison, the typical organization of the conventionally-used time stamp is illustrated in FIG. 10C. Although the conventional time stamp also comprises a combination of the time stamp and the first to fifth sampled data following the time stamp, the time stamp has a data size, such as a 32-bit size, that is different from that used in the present invention. Specifically, the lower 12 bits of the time stamp indicate the time position t of the first sampled data in the packet as in the example of the invention, and the following 13 bits indicates a unique number of the reference cycle, and the uppermost seven bits indicates a time point in seconds. Because the conventional time stamp is arranged to express the whole of absolute time shared between all of the nodes, it needs a data size or length that is 20 bits greater than the one in the present invention.

In the network system of the present invention, where each transmission data generated in accordance with the first timing is sent out to the network in accordance with the second timing, the second timing is sometimes generated with some time lag behind the first timing, as noted above. As a consequence, it is possible that two transmission data are undesirably contained within a same reference cycle determined on the basis of the first timing. Even in such an undesirable situation, the data communication system according to the present invention can accurately reproduce the original data at respective predetermined time positions without involving any inconveniences.

Figure 11:
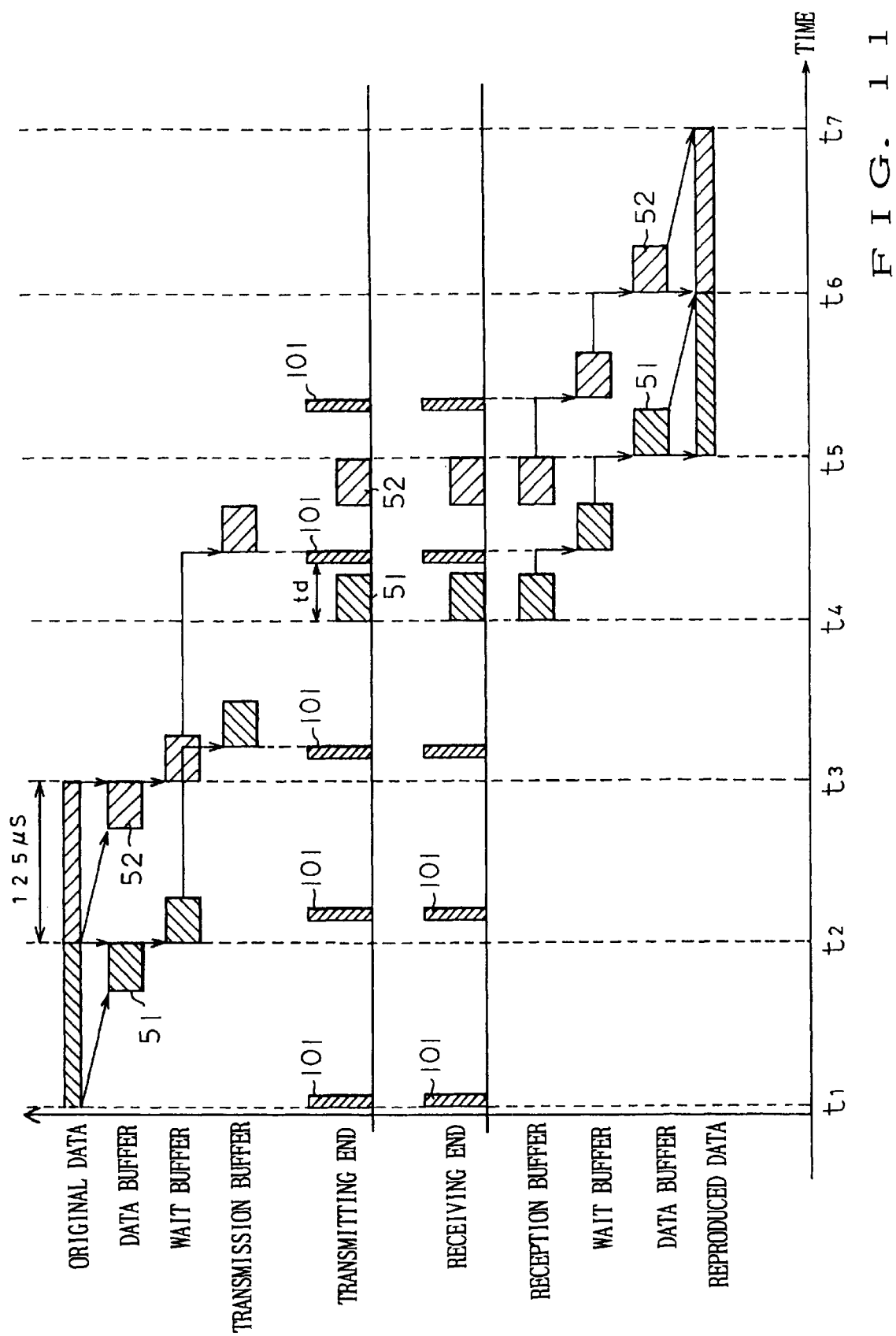
FIG. 11 is a timing chart explanatory of behavior of the data communication system in accordance with the second embodiment of the present invention.

Now, a description will be given about behavior of the data communication system of the present invention, with reference to a time chart of FIG. 11, where the horizontal axis represents the passage of time. Data obtained by sampling the original data within a reference cycle from time point t1 to time point t2 are formed into a packet 15 with a 12-bit time stamp as stated above and temporarily stored in the data buffer 132. The packet 51 thus stored in the data buffer 132 is written into the FIFO-type wait buffer 133 in response to a cycle timer output generated at time point t2.

Another packet 52 corresponding to the original data within a period from time point t2 to time point t3 is similarly produced and temporarily stored in the data buffer 132. Upon arrival at time point t3, the packet 52 is written into the FIFO-type wait buffer 133 in response to the cycle timer output. A cycle start packet has not yet been transmitted at time point t3 as previously mentioned, and thus the two packets 51 and 52 are stored in the wait buffer 133 at time point t3. As illustrated, once a transmission cycle is initiated slightly after time point t3 and the cycle start packet is transmitted, a cycle start signal is output, in response to which the packet 51 is transferred to the above-mentioned transmission buffer 134. Then, the packet thus stored in the transmission buffer 134 will be sent out to the communication network 110 at a time point corresponding to the isochronous channel within this transmission cycle.

In the illustrated example, the transmission cycle is initiated slightly after the reference cycle, so that the transmission of the packet 51 takes place after next reference timing point t4. Thus, the packet 51 will be stored into the reception buffer 135 after time point t4. Once a next transmission cycle is initiated a time td later than time point t4 and the cycle start packet 101 is sent out, the second packet 52 is transferred to the transmission buffer 134 and then sent out to the network 110 during this transmission cycle period. In this way, the two packets will be transmitted and received within the single reference cycle from time point t4 to time point t5.

The two packets 51 and 52 are received and written into the reception buffer 135 during the period from time point t4 to time point t5. The received and written packets 51 and 52 are transferred to the wait buffer 136 in response to the cycle start signal and then passed from from the wait buffer 136 to the data buffer 137 in response to a cycle timer output indicative of the reference timing. More specifically, the first packet 51 is stored into the reception buffer 135 immediately after time point t4 and then stored into the wait buffer 136 in response to the cycle start signal indicative of a start of the next transmission cycle. At that time, the second packet 52 transmitted in the transmission cycle initiated in response to that cycle start signal has been stored in the reception buffer 135. Upon arrival at time point t5, the packet 51 stored in the wait buffer 136 is written into the data buffer 137 in response to the cycle timer output so that it is reproduced on the time axis by means of the data utilizing circuit 138. The other packet 52 having been stored in the reception buffer 135 is transferred to the wait buffer 136 in response to the cycle start signal indicative of a start of another transmission cycle and written into the data buffer 137 at time point t6, so that it is reproduced at accurate timing during a period from time point t6 to t7.

In the above-mentioned manner, it is possible to reproduce the original data at accurate timing by just using the time stamp data that consists of a reduced number of bits and only represents a difference or deviation from a cycle timer output point within the reference cycle.

Figure 12A:
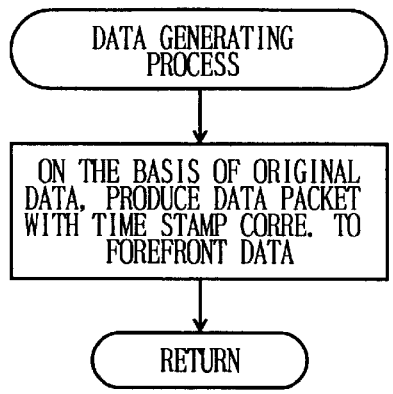
FIGS. 12A to 12C are flow charts of various processes carried out at the transmitting end in the data communication system in accordance with the second embodiment.
Figure 12B:
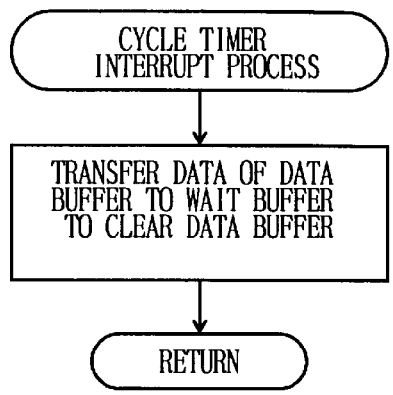
Figure 12C:
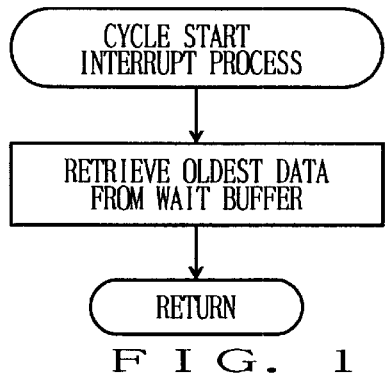
Figure 13A:
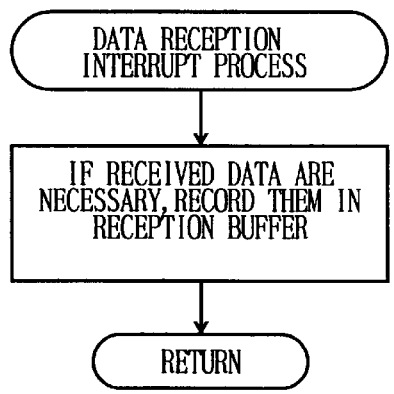
FIGS. 13A to 13C are flow charts of various processes carried out at the receiving end in the data communication system in accordance with the second embodiment.
Figure 13B:
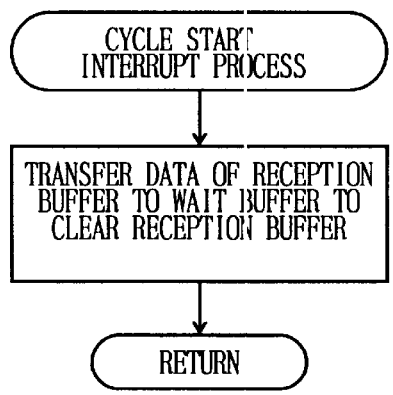
Figure 13C:
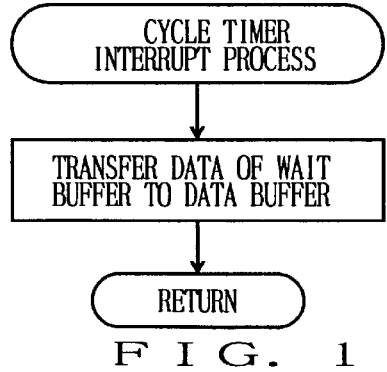

The above-described functions can also be implemented by software. FIGS. 12A to 12C and FIGS. 13A to 13C are flow charts of various processes carried out at the transmitting and receiving ends to perform these functions. Specifically, FIGS. 12A to 12C illustrate the processes carried out at the transmitting end, while FIGS. 13A to 13C illustrate the processes carried out at the receiving end.

FIG. 12A shows a data generating process executed at the transmitting end, which corresponds to the function of the above-mentioned data generating circuit and produces a data packet, of the original data to be transmitted, having a time stamp indicative of a time position value of the forefront data.

FIG. 12B shows a cycle timer interrupt process executed at the transmitting end in response to a cycle timer interrupt signal indicative of the above-mentioned first timing, where the data of the data buffer are transferred to the wait buffer to clear the data buffer.

Further, FIG. 12C shows a cycle start interrupt process initiated at the transmitting end in response to a cycle start interrupt signal generated upon receipt of the cycle start packet, which retrieves the oldest data in the wait buffer and transfers the retrieved data to the transmission buffer.

FIG. 13A shows a data reception interrupt process executed at the receiving end upon receipt of a packet via the communication network, where the packet is recorded into the reception buffer if the received data are considered to be necessary data in the receiving station. FIG. 13B shows a cycle start interrupt process executed at the receiving end in response to the cycle start interrupt signal generated upon receipt of the cycle start packet, where the data of the reception buffer are transferred to the wait buffer to clear the reception buffer of the packet. Further, FIG. 13C shows a cycle timer interrupt process initiated at the receiving end in response to the cycle timer interrupt signal, which retrieves the oldest data in the wait buffer and transfers the retrieved data to the data buffer.

It will be appreciated that whereas the second embodiment of the present invention has been described above in relation to the case where the IEEE1394 high-speed serial system is employed, it is not so limited and also applicable to any other network systems supporting similar isochronous transmission.

Further, the number of bits in the time stamp may be set as desired depending on required time accuracy or the like.

Moreover, the data to be transmitted may be other data than tone-related data, such as picture (animation) data and time-varying data including non-tone-related waveform data.

The second embodiment having been described so far can effectively reduce the necessary number of bits in the time stamp, thus achieving an enhanced transmission efficiency.

Next, a description will be made about a data communication system in accordance with a third embodiment of the present invention.

Figure 14:
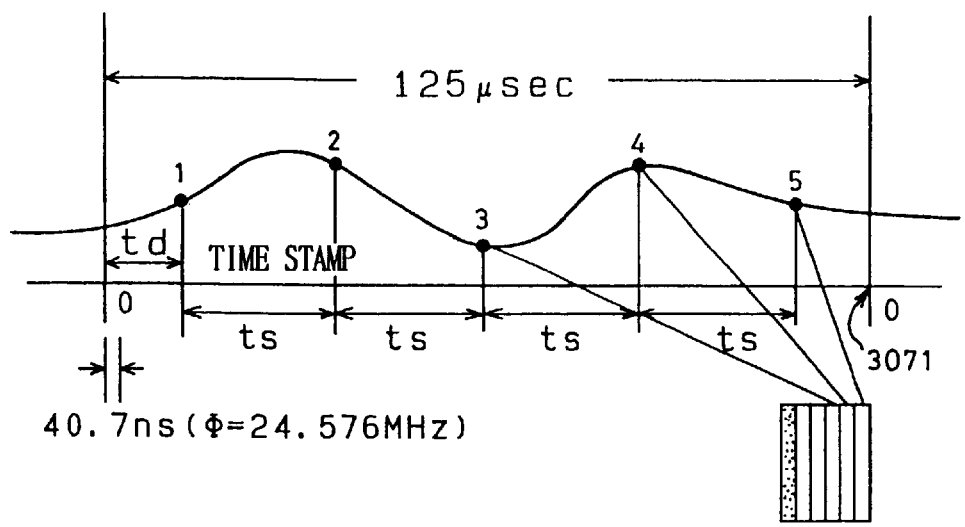
FIG. 14 is a diagram explanatory of an exemplary transmission packet in a time-serial fashion.

In the third embodiment, there may employed a system organization similar to the one shown in FIG. 7, and the internal structure of each of a plurality of nodes may also be similar to the one shown in FIG. 8. FIG. 14 is a diagram explanatory of a transmission packet in the third embodiment, which is also similar to that shown in FIGS. 10A and 10B.

Figure 15:
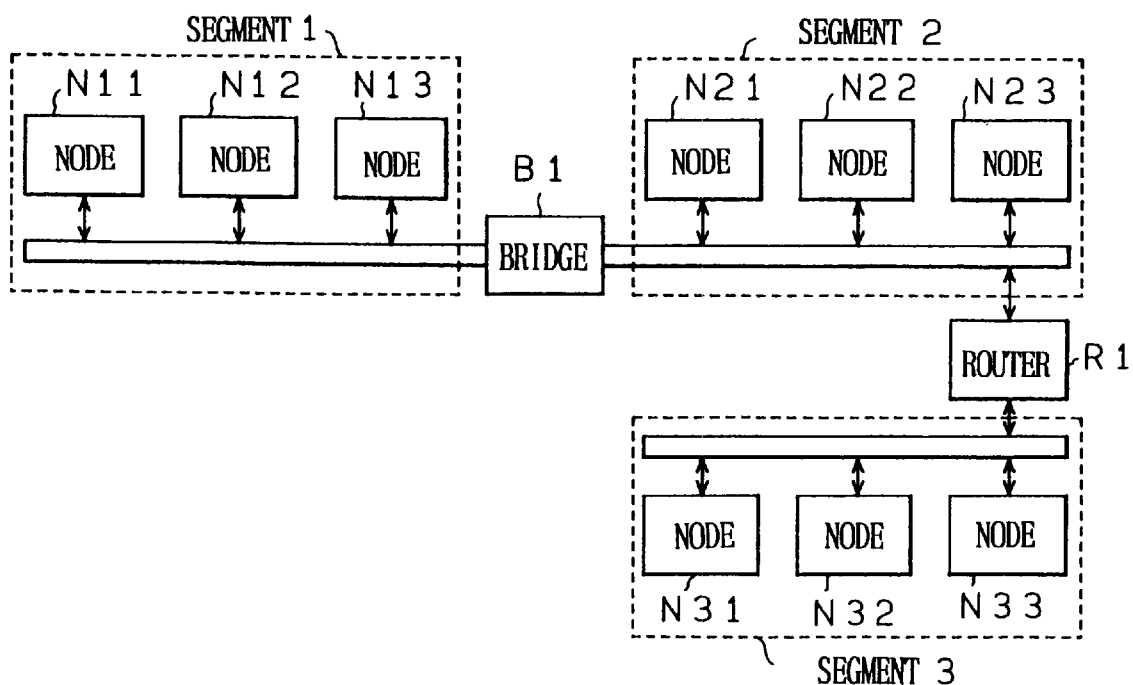
FIG. 15 is a block diagram showing an exemplary organization of a communication network to which is applied a data communication system according to a third embodiment of the present invention.

FIG. 15 is a block diagram showing an exemplary organization of a communication network to which is applied the data communication system according to the third embodiment.

As shown in FIG. 15, the communication network comprises segment 1 including nodes N11 to N13, segment 2 including nodes N21 to N23, and segment 3 including nodes N31 to N33. The communication network also includes a bridge B1 between buses of segment 1 and segment 2, and a router R1 between buses of segment 2 and segment 3.

The bridge B1 includes a physical layer and a data link layer and interconnects the bus of segment 1 and the bus of segment 2. The router R1, which is capable of interconnecting transmission paths of different protocols, interconnects the bus of segment 2 and the bus of segment 3. Note that whereas the bridge B1 and router R1 may be constructed in a similar manner to the node shown in FIG. 8, these two elements are not provided with the data utilizing/generating circuit 125.

In the communication network of FIG. 15, both isochronous transmission and asynchronous packet transmission are carried out in the manner as described earlier in relation to FIG. 25. As a consequence, the cycle start packet is transmitted basically at time intervals corresponding to the output timing of the cycle timer (i.e., 125 $\mu$sec.); however, when transmission of another packet is under way, transmission of the cycle start packet is waited until the transmission of the other packet is completed.

The data communication system of the invention, which is applied to such isochronous transmission and asynchronous packet transmission between the segments are carried out via the bridge B1 and router R1.

In the communication network of FIG. 15, the asynchronous packet transmission is caused to continue until the packet is completely transferred, and thus it is likely that the transfer will continue beyond the period of the cycle timer. As a result, there may occur such an undesirable situation where two transmission data are included within one operating cycle of the cycle timer. However, even in such a situation, the data communication system of the invention can properly transmit data without loosing a relative time-positional relationship between the individual data and thus reproduce the original data at predetermined time positions.

Behavior of the data communication system according to the third embodiment of the present invention will be described below, with reference to a time chart of FIG. 16, where the horizontal axis represents the passage of time. Data Si-2, obtained by sampling the original data in one cycle (frame) from time point ti-2 to time point ti-1 as illustrated in section (b), are formed into a packet A1 with a 12-bit time stamp as stated above and temporarily stored in the data buffer. The packet A1 thus stored in the data buffer is written into the wait buffer in response to a cycle timer output generated at time point ti-1. Then, upon detection of a cycle start packet having been sent out from the cycle master after time point ti, the packet B1 stored in the wait buffer is stored into the transmission buffer as a packet Co. Thereafter, the packet C1 thus stored in the transmission buffer is sent out to the network as a packet D1 as shown in FIG. 15 at predetermined timing allocated to a particular channel though which the packet is to be transmitted.

Similarly, data Si-1, obtained by sampling the original data in another cycle (frame) from time point ti-1 to time point ti, are formed into another packet A2 with a 12-bit time stamp and temporarily stored in the data buffer. The packet A2 thus stored in the data buffer is written into the wait buffer in response to a cycle timer output generated at time point ti. Then, upon detection of a cycle start packet that is sent out from the cycle master after time point ti+1, the packet B2 stored in the wait buffer is stored into the transmission buffer as a packet C2. Thereafter, the packet C2 thus stored in the transmission buffer is sent out to the network as shown in FIG. 15 at predetermined timing allocated to the particular channel.

In this case, the two packets D1 and D2 of the same channel would coexist in a frame between time point ti+1 and time point ti+2 since the time of the cycle start packet transmission in the frame between time point ti and time point ti+1 is considerably delayed behind time ti due to the nature of the asynchronous transmission. Because the time stamps attached to the packets D1 and D2 are expressed in relative time values, the data in the two packets D1 and D2 may mix together if a reproduction process is executed in simple form at the receiving end; namely, the relative time-positional relationship between the individual data may be lost.

Figure 16:
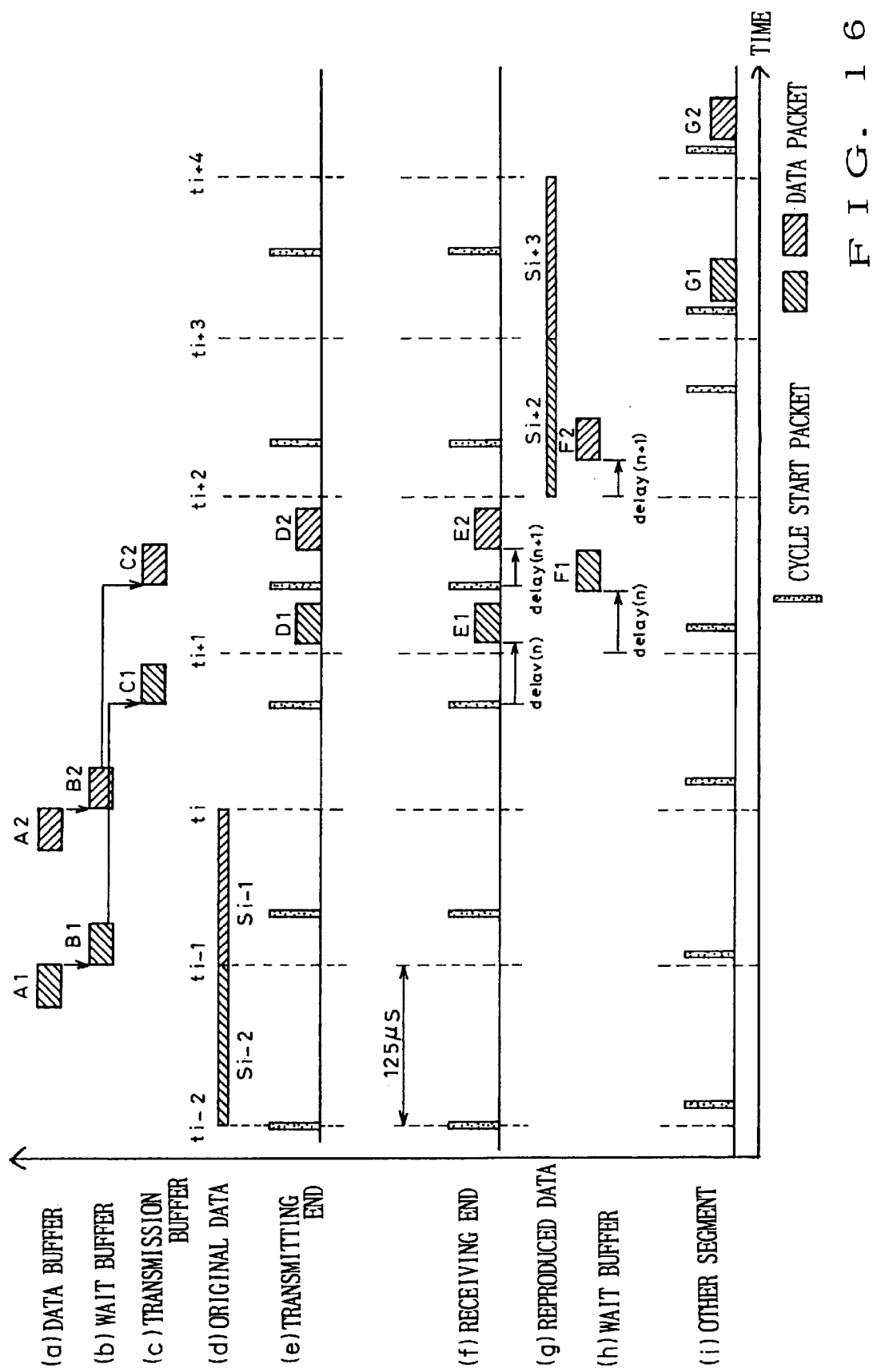
FIG. 16 is a time chart explanatory of behavior of a data communication system according to a third embodiment of the present invention.

To avoid such a loss of the relative time-positional relationship between the individual data, the data communication system of the invention carries out processes as illustrated in sections (f) to (i) of FIG. 16 by means of the bridge B1 and router R1 of FIG. 15.

In the process illustrated in section (f) of FIG. 16, an operation is performed to determine a delay time delay(n)n of a received packet E1 from the corresponding cycle start packet. Similarly, a delay time "delay(n+1)" of another received packet E2 from the corresponding cycle start packet is measured. After that, operations are performed to impart a transferring time stamp to the received packet E1 and to replace the previously-attached time stamp of the packet E1 with a reproducing time stamp. In these operations, it is first ascertained which of the cycle timer cycles the received packet E1 belongs to; here, a particular frame where the cycle start packet corresponding to the packet E1 is resident is determined as the frame containing the packet E1.

Namely, because the cycle start packet corresponding to the received packet E1 was sent out in the frame between time points ti and ti+1, the packet E1 is determined as belonging to the frame that starts at time point ti. In a similar manner, the other packet E2 is determined as belonging to the frame that starts at time point ti+1.

Thereafter, a time stamp value, obtained by adding one frame time length and delay time "delay(n)" to the time value at time point ti, is attached to the packet E1 as a transferring time stamp. Then, upon arrival at the time represented by the transferring time stamp, i.e., when a predetermined time equivalent to the delay time "delay(n)" has elapsed from time point ti+1, the packet E1 is stored into the wait buffer as a packet F1, as illustrated in section (h) of FIG. 16.

The other packet E2 is treated similarly. That is, a time stamp value, obtained by adding one frame time length and delay time "delay(n+1)" to the time value at time point ti+1, is attached to the packet E2 as a transferring time stamp. Then, upon arrival at the time represented by the transferring time stamp, i.e., when a predetermined time equivalent to the delay time "delay(n+1)" has elapsed from time point ti+1, the packet E2 is stored into the wait buffer as a packet F2, as illustrated in section (h) of FIG. 16.

The packet F1 thus stored in the wait buffer is stored into the transmission buffer upon detection of a cycle start packet that has been sent to another segment in the frame starting at time point ti+3, and then it is transmitted, as a packet G1, to the other segment at predetermine timing allocated to a particular channel by which the packet F1 is to be transmitted, as illustrated in section (i) of FIG. 16. Similarly, the other packet F2 stored in the wait buffer is stored into the transmission buffer upon detection of a cycle start packet that has been sent to another segment in the frame starting at time point ti+4, and then it is transmitted, as a packet G2, to the other segment at predetermine timing allocated to the particular channel, as illustrated in section (i) of FIG. 16.

The reason why the transferring time stamp is generated by adding the delay time "delay(n)" or "delay(n+1)" of the received packet from the corresponding cycle start packet is that there is likelihood that it won't be fully accommodated within a single frame unless the delay time is duly taken into account.

The previously-attached time stamp of the received packet E1 is replaced with a reproducing time stamp that is newly generated by adding, to the time value of time point ti, one frame time length and relative time value of the previously-attached time stamp. Then, upon arrival at the time represented by the reproducing time stamp, i.e., when a time equivalent to the relative time stamp value has elapsed from time point ti+1, the data of the packet E1 are sent to the data utilizing circuit 125, so that the data in the packet are reproduced on the time axis in the frame starting at time point ti+2 as illustrated in section (g) of FIG. 16.

Similarly, the previously-attached time stamp of the other received packet E2 is replaced with a reproducing time stamp that is newly generated by adding, to the time value of time point ti+1, one frame time length and relative time value of the previously-attached time stamp. Then, upon arrival at the time represented by the reproducing time stamp, i.e., when a time equivalent to the relative time stamp value has elapsed from time point ti+2, the data of the packet E2 are sent to the data utilizing circuit 125, so that the data in the packet are reproduced on the time axis in the frame starting at time point ti+3 as illustrated in section (g) of FIG. 16.

The above-described operations may be performed either by software or by hardware. Processes executed at the transmitting end to implement the essential functions in the third embodiment may follow the same operational sequences as flowcharted in FIGS. 12A to 12C.

Figure 17:
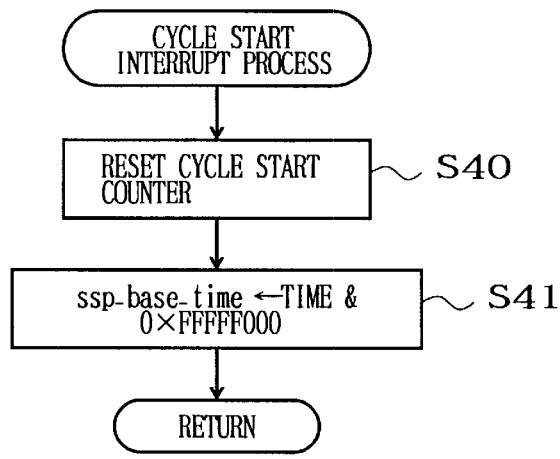
FIG. 17 is a flow chart of a cycle start interrupt process carried out at the receiving end in the data communication system according to the third embodiment.
Figure 18:
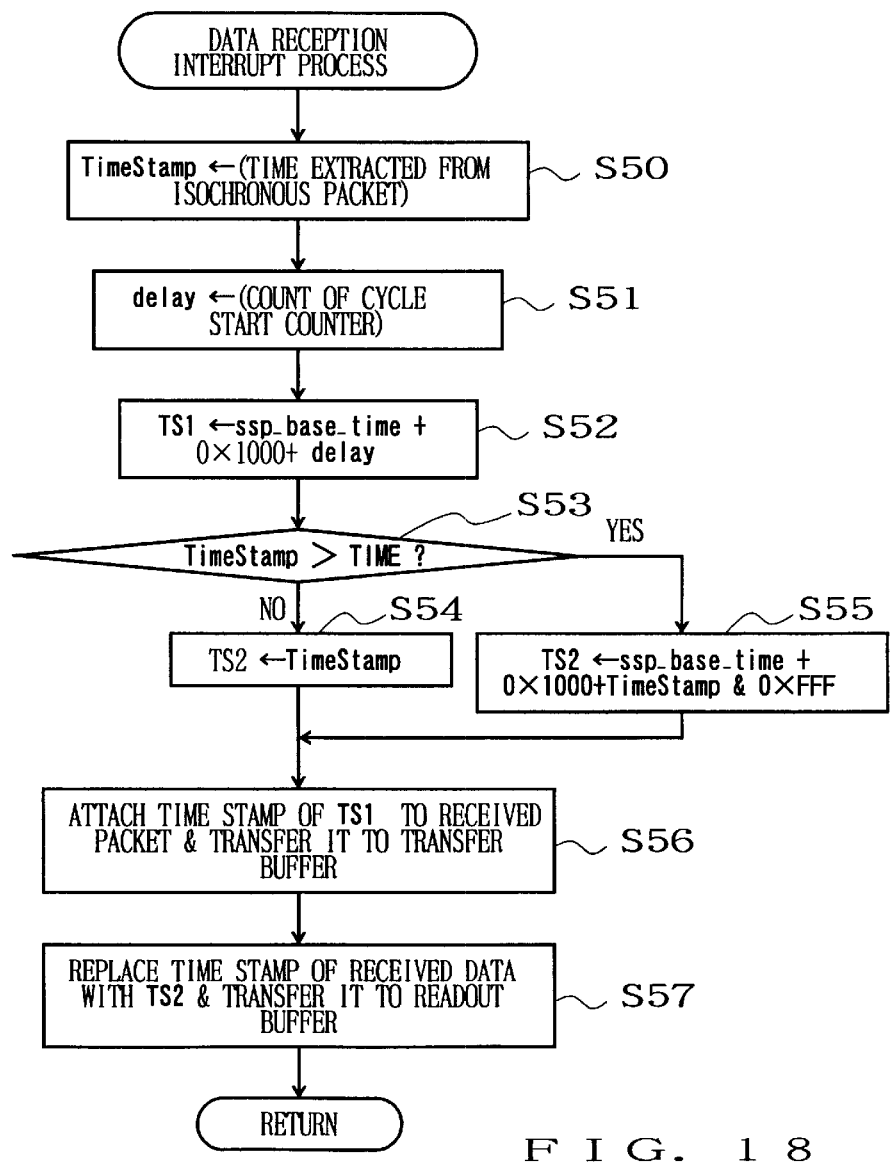
FIG. 18 is a flow chart of a data reception interrupt process carried out at the receiving end in the data communication system according to the third embodiment.
Figure 19:
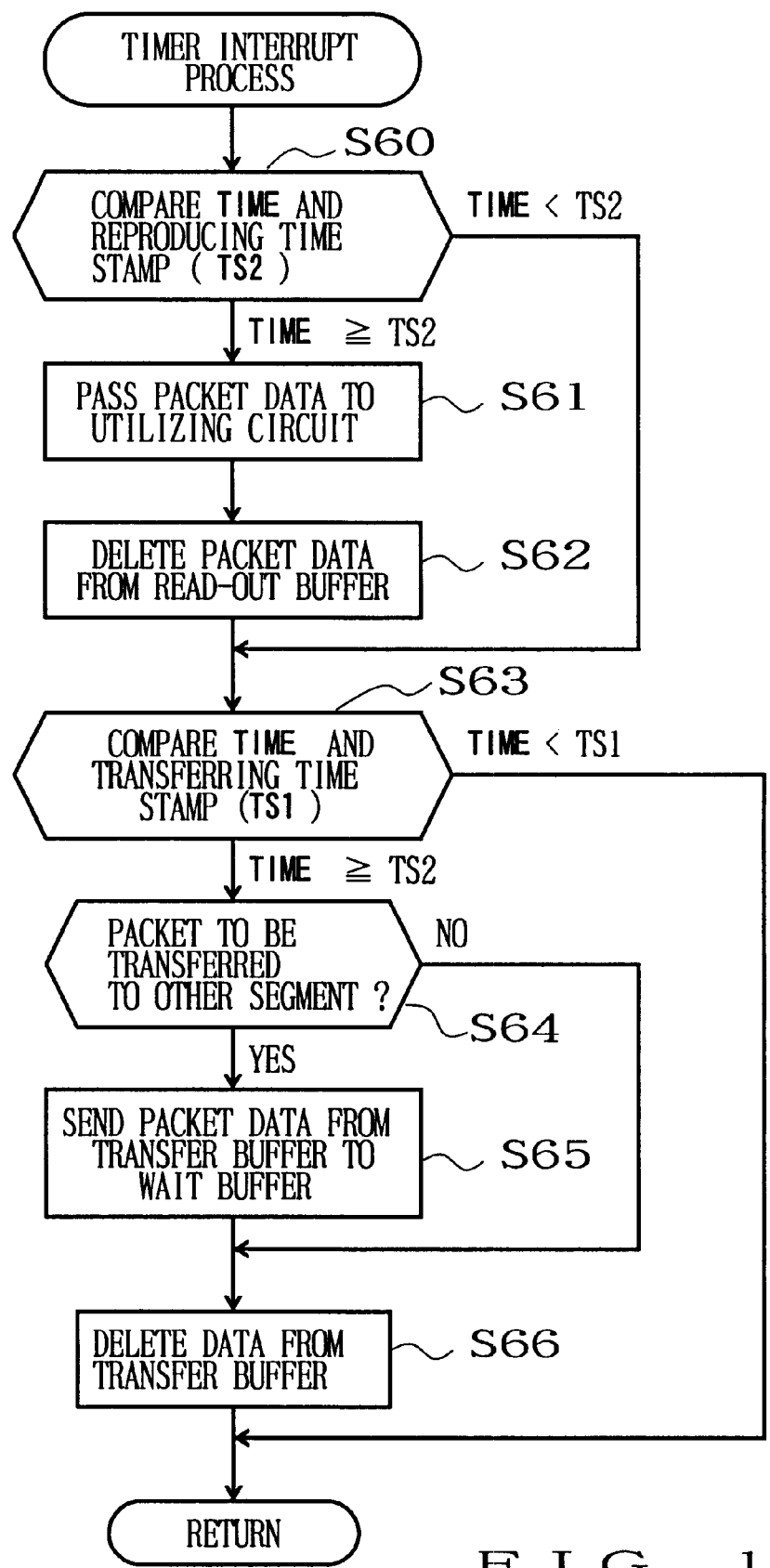
FIG. 19 is a flow chart of a timer interrupt process carried out at the receiving end in the data communication system according to the third embodiment.

FIGS. 17, 18 and 19, which will be described below, are flow charts explanatory of the functions of the bridge B1 and router R1 shown in FIG. 15.

FIG. 17 is a flow chart of a cycle start interrupt process carried out at the receiving end in the third embodiment. In this cycle start interrupt process, which is initiated by a cycle start interrupt signal generated in response to reception of a cycle start packet, a cycle start counter for measuring time within each frame is first reset to an initial value at step S40. At next step S41, the cycle start interrupt process extracts data of upper 20 bits from among 32-bit time information TIME stored in a cycle timer register that increments its count in accordance with the passage of time on the communication network, and stores the extracted time information into a register ssp—base—time. The extraction of the upper-20-bit data is effected by ANDing the time information TIME and hexadecimal data "0xFFFFF000".

Here, the upper 20 bits of the time information TIME together constitute information that identifies particular timing at which the frame in question should start, and the remaining 12 bits of the time information TIME together constitute information that identifies a changing time point within the frame.

FIG. 18 is a flow chart of a data reception interrupt process carried out at the receiving end in the third embodiment. In this data reception interrupt process, which is initiated by a data reception interrupt signal generated in response to reception of a packet, the time stamp attached to the received isochronous packet is extracted and stored into a register Time Stamp at step S50. Then, a current counted value of the cycle start counter is set into a register "delay" as a delay time of the received packet, at next step S51.

At next step S52, hexadecimal data "0x1000" and the delay time set in the "delay" register are added to the time information stored in the register ssp—base time, and the added time information is then stored into a register TS1.

After that, a determination is made at step S53 as to whether the time stamp value stored in the register Time Stamp is greater than the value of the time information TIME. With an affirmative (YES) determination, it means that the time represented by the time stamp has not yet arrived, so that the process moves on to step S55 in order to add together the time information stored in the register ssp—base—time, the hexadecimal data "0x1000" and the time stamp value stored in the register Time Stamp. The added result is then stored into a register TS2 as a value of the above-mentioned reproducing time stamp.

If, on the other hand, a negative (NO) determination is made at step S53, it means that the time represented by the time stamp has already lapsed, so that the process moves to step S54 in order to set the time stamp value, stored in the register Time Stamp, into the register TS2 as a value of the above-mentioned reproducing time stamp.

After that, the data reception interrupt process moves on to step S56, where the time information stored in the register TS1 is attached to the received packet as a transferring time stamp and then transferred to a transfer buffer. Further, at step S57, the time stamp attached to the received data is replaced with the reproducing time stamp stored in the register TS2 and then transferred to a readout buffer.

FIG. 19 is a flow chart of a timer interrupt process carried out at the receiving end in the third embodiment. In this timer interrupt process, which is initiated by a timer interrupt signal generated every reference clock pulse of the system having a frequency of 24.576 MHz (i.e., a 40.7 nanosecond period), a comparison is made at step S60 between the time information TIME currently stored in the cycle timer register and the replaced or newly attached time stamp currently stored in the readout register, i.e., the reproducing time stamp stored in the register TS2. If the compared two time values match each other or the time represented by the time information TIME has passed the time represented by the reproducing time stamp as determined at step S60, it means that predetermined reproduction timing has already arrived, and the process moves on to step S61 to read out and pass the packet data in the readout buffer to the data utilizing circuit, so that the circuit reproduces the packet data on the time axis. Then, the packet data are deleted from the readout buffer at step S62.

If the time represented by the time information TIME has not yet passed the time represented by the reproducing time stamp as determined at step S60, it means that predetermined reproduction timing has not yet arrived, and the process jumps to step S63 without performing the reproduction operation.

At step S63, a comparison is made between the time information TIME stored in the cycle timer register and the newly-attached time stamp currently stored in the transfer register, i.e., the transferring time stamp now stored in the register TS1. If the compared two time values match each other or the time represented by the time information TIME has passed the time represented by the transferring time stamp as determined at step S63, it means that predetermined transfer timing has already arrived, and the process moves on to step S64 to determine whether or not the packet currently stored in the transfer buffer is to be transferred to another segment. If a YES determination is made at step S64, the process goes to step S65 to send the packet data from the transfer buffer to the wait buffer. Then, the packet data are deleted from the transfer buffer at step S66. As previously noted, the packet data thus sent to the wait buffer are sent out to the other segment upon detection of a cycle start packet in a predetermined frame of the other segment.

If the time represented by the time information TIME has not yet passed the time represented by the transferring time stamp as determined at step S63, it means that predetermined transfer timing has not yet arrived, so that the timer interrupt process is brought to an end. Further, if the packet currently stored in the transfer buffer has been determined as a packet not to be transferred to another segment as determined at step S64, then the process jumps to step S66 to delete the packet data from the transfer buffer without performing the transfer operation of step S65.

It will be appreciated that whereas the third embodiment of the present invention has been described above in relation to the case where the IEEE1394 high-speed serial bus system is employed, it is not so limited and also applicable to any other network systems supporting similar isochronous transmission.

Further, the number of bits in the time stamp may be set as desired depending on required time accuracy or the like.

The third embodiment having been described so far is characterized in that a time value, obtained by adding the time delay of the received data from the corresponding cycle start packet and one cycle time length to the start time point of a cycle which the cycle start packet belongs to, is attached to the received data as a transferring time stamp. With this arrangement, the third embodiment achieves an enhanced data transmission efficiency and also can avoid loosing the relative time-positional relationship between the individual data.

The third embodiment is also characterized in that a time value, obtained by adding the time delay of the received data from the corresponding cycle start packet and one cycle time length to the start time point of a cycle which the cycle start packet belongs to, is attached to the received data as a reproducing time stamp. With this arrangement, the third embodiment achieves an enhanced data reproduction efficiency without loosing the relative time-positional relationship between the individual data, even when the reproducing time stamp is of a small bit size or length, say, below 32 bits.

Next, a description will be made about a fourth embodiment of the present invention.

FIG. 20 is a block diagram showing an example of a network system to which is applied a network data synchronizing system in accordance with the fourth embodiment of the present invention. In this figure, reference character N41 represents node 1 which is, for example, a tone source similar to node 1 of FIG. 26. Further, reference characters N42 and N43 represent node 2 and node 3, which are, for example, a reverberation process section and a panning process section, respectively, that are similar to node 2 and node 3 of FIG. 26. N44 represents node 4 which is a time aligner that synchronizes various data on the communication network, as will be detailed later. Furthermore, reference character N45 represents node 5, which is, for example, a mixer similar to node 4 (N4) of FIG. 26.

In the communication network thus arranged, node 1 (N41), which transmits tone data to a corresponding channel at each predetermined timing (every frame), attaches, to each one of the tone data to be transmitted, a data mark indicative of transmission timing of the data. Typically, as such a data mark, an unique identification number of the frame, time stamp data or the like is used.

In a similar manner to the above-described case of FIG. 26, data (such as tone data) output from node 1 (N41) at same timing are sent through different routes or paths to some of the nodes for predetermined processing and then fed to the time aligner node or node 4 (N44).

Namely, similarly to the case of FIG. 26, four different types of data are input to node 4 (N44): first-type data that is directly supplied from node 1 (N 41) to node N4 as denoted by arrow A14; second-type data that is first passed from node 1 (N41) to node 2 (N42) for predetermined processing, such as a reverberation process, and then supplied to node 4 (N44) as denoted by arrow A124; third-type data that is first passed from node 1 (N41) to node 2 (N42) for predetermined processing, such as a reverberation process, then to node 3 (N43) for predetermined processing, such as a panning process, and then supplied to node 4 (N44) as denoted by arrow A1234; and fourth-type data that is first passed from node 1 (N41) to node 3 (N43) for predetermined processing, such as the panning process, and then supplied to node 4 (N44) as denoted by arrow A134.

FIG. 21 is a time chart showing a manner in which the various data output concurrently from node 1 (N41) arrive at node 4 (N44) via the respective routes. As shown, of all the four types of data to be supplied to node 4 (N44), the first-type data (A14) arrives at node 4 earliest. If times required from the processing in node 2 and node 3 are provisionally represented by a2 and a3, respectively, the second-type data (A124) arrives at node 4 later than the first-type data (A14) by the time a2, the fourth-type data (A134) arrives at node 4 later than the first-type data (A14) by the time a3, and the third-type data (A1234) arrives at node 4 later than the first-type data (A14) by a sum of the times a2 and a3.

Node 4 (N44) functioning as the time aligner synchronizes these data arriving via the respective routes with different time delays and then sends the data to node 5 or mixer node (N45) at same timing. The time aligner includes buffers, separately provided for individual channels to be synchronized, for temporarily storing the received data on a channel-by-channel basis, and when data having a same data mark have been received for all of the channels to be synchronized, the time aligner sequentially outputs the received data of the individual channels which have the same data mark. This way, the data output at the same timing from node 1 (N41) but arriving at node 4 with non-uniform time delays are properly adjusted or aligned via node 4 to same supply timing so that they can be simultaneously supplied from node 4 to node 5 functioning as the mixer.

Behavior of the individual nodes in the thus-arranged network system will be more fully described below with reference to FIGS. 22 to 24.

Figure 22:
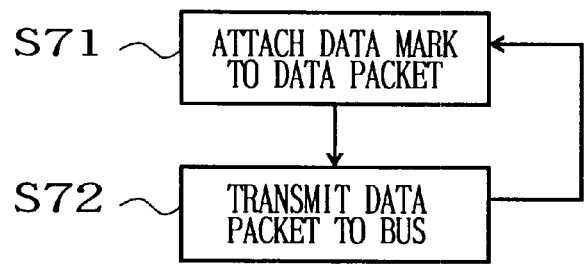
FIG. 22 is a flow chart explanatory of behavior of a node transmitting original data in the fourth embodiment.

FIG. 22 is a flow chart explanatory of behavior of node 1 (N41) transmitting original data. As shown, this node produces data packets by attaching a same data mark to each group of transmission data that is to be transmitted in a same frame, at step S71. At next step S72, the thus-produced data packets with the same data mark are transmitted to desired destinations, using different channels. For example, channel 1 is used for the data packet to be transmitted directly to node 4 (N44), channel 2 is used for the data packet to be transmitted to node 2 (N42), and channel 3 is used for the data packet to be transmitted to node 3 (N43).

Figure 23:
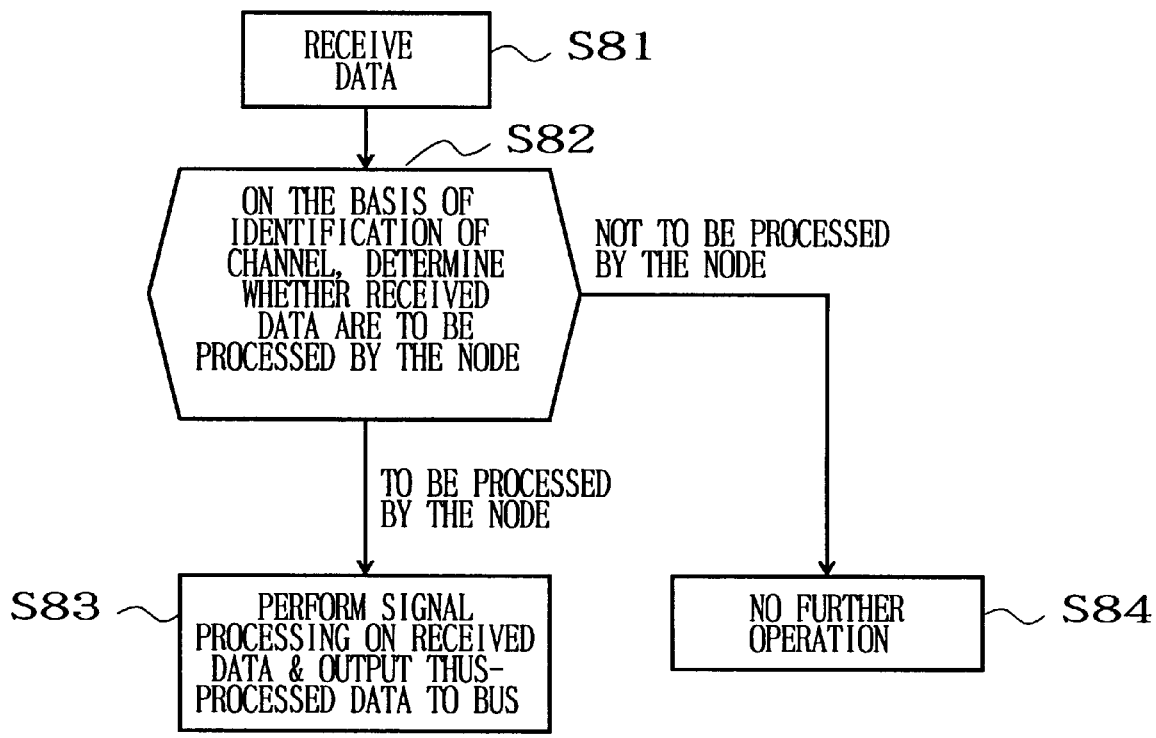
FIG. 23 is a flow chart showing operation of a data receiving node in the fourth embodiment.

FIG. 23 is a flow chart showing operation of an ordinary receiving node such as node 2, node 3 or node 5 (N42, N43 or N45). As shown, the receiving node receives the data of the predetermined channel at step S81, and then determines at next step S82 whether the received data are to be actually processed by the node. This determination can be made by comparing the channel of the received data with a channel preset for that receiving node. If the received data are to be actually processed by the receiving node as determined at next step S82, the node performs a predetermined process on the data at step S83; for example, if the receiving node is node 2, it performs the reverberation process on the received data, or if the receiving node is node 3, it performs the panning process on the received data. The thus-processed data are sent out to the communication network. In the event that the received data are not to be processed by the receiving node as determined at step S82, the receiving node branches to step S84 to terminate the operational flow without performing any further operation on the received data.

Figure 24:
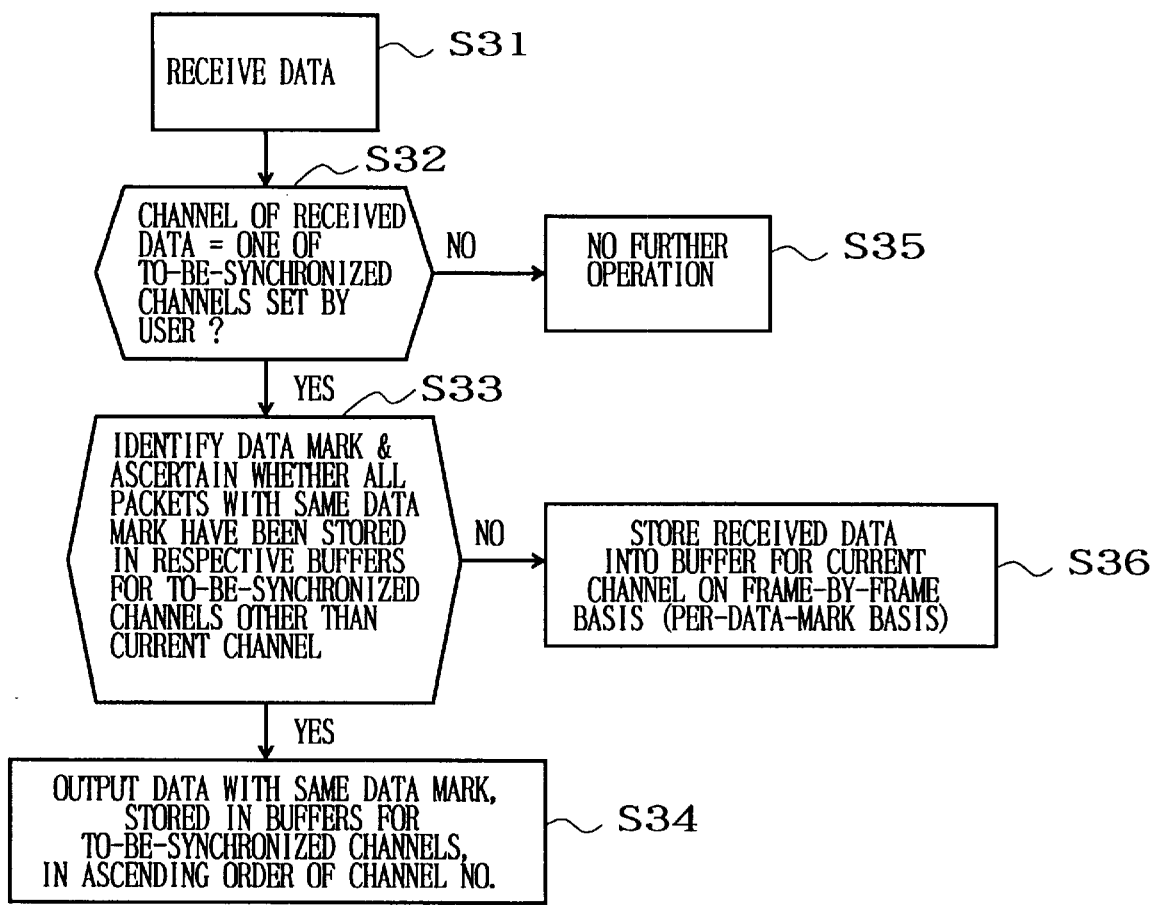
FIG. 24 is a flow chart explanatory of behavior of a synchronization-controlling node in the fourth embodiment.

Further, FIG. 24 is a flow chart showing operation of the above-mentioned time aligner or node 4 (N44). In this time aligner node, predetermined channels to be synchronized are preset via user entry or otherwise. As shown, the time aligner node receives the transmitted data at step S31, and then determines at next step S32 whether the received data belong to any one of tho preset to-be-synchronized channels. If the channel of the currently received data is not one of the to-be-synchronized channels as determined at step S32, the time aligner node branches to step S35 to terminate the flow without performing any further operation on the received data.

If, on the other hand, the channel of the currently received data is one of the to-be-synchronized channels as determined at step S32, then the time aligner node proceeds to step S33 to identify the data mark attached to the received data packet and ascertain whether all the data packets with the same data mark have already been stored in respective buffers provided for the to-be-synchronized channels other than the channel of the currently received data packet. If answered in the affirmative (YES), it means that the currently received data packet has arrived at the time aligner node latest of all the packets with the same data mark, so that the node moves on to step S34 in order to output all of the data with the same data mark, now stored in the buffers associated with the to-be-synchronized channels, in ascending order of channel number. In this manner, all of the data with the same data mark, having arrived at this time aligner node or node 4 via different routes, can be output to node 5 (N45) concurrently at same timing.

If, on the other hand, the data packets with the same data mark have not yet been stored in all the buffers, a negative (NO) determination is made at step S33 and the currently received data are stored into the buffer associated with the channel of the data at step S36. Note that these buffers are provided to store the packets of the corresponding channels on the frame-by-frame basis, because it is possible that packets of the individual channels sent in a current frame arrive before arrival of all packets of a preceding frame.

In the foregoing manner, data packets arriving at different times can be adjusted or aligned by the time aligner node so as to be output at same timing.

Although node 4 (N44) in the fourth embodiment has been described above as only functioning as the time aligner, this is just illustrative, and the time aligning function may be allocated to any of the other ordinary nodes; for example, node 5 (N45) may be arranged to perform the time aligning function. However, it is desirable that the time aligner be positioned immediately before the output node.

Further, whereas the embodiment has been described in relation to the case where predetermined data transmission channels are preset for the individual nodes, the present invention is not so limited; for example, each data packet may be arranged to contain destination data specifying a particular node to which the data are to be transmitted so that each of the nodes can determine, from the destination data, whether or not the data packet is the one that should be received by that node.

Moreover, whereas the embodiment has been described above in relation to a communication network based on the IEEE1394 bus system, the present invention may be applied to networks based on any other suitable interfaces.

In addition, whereas the embodiment has been described above in relation to a tone generating apparatus, it should be obvious that the present invention is also applicable to transmission of data whose accurate reproducibility on the time axis is to be guaranteed or which have to be synchronized with each other.

As may be apparent from the foregoing, the network data synchronizing method and system in accordance with the fourth embodiment of the invention provides for accurate synchronization of various data transmitted via a plurality of routes on a communication network.

It is important to note that all of the above-described embodiments of the invention are, of course, also applicable to transmission, via the Internet, of audio data and a variety of other data whose accurate reproducibility on the time axis is to be guaranteed or which have to be synchronized with each other.

Finally, it is also important to note that software products, such as recording media containing software programs relating to the data transmission and/or data reception processing that has been described above as being implemented using software, are also within the scope of the present invention.

What is claimed is:

1. A data communication method comprising the steps of:
   (a) at a transmitting end,
   supplying a plurality of groups of data arranged in a time series, each group of data having a first period, said first period being a variable period;
   specifying one group of data every predetermined number of groups of data, not smaller than two, and attaching to the specified group of data time information indicative of a time position of the specified group of data; and
   transmitting the predetermined number of groups of data and any attached time information, together as a packet, to a communication network at a predetermined time in a predetermined second period asynchronous with said first period, and
   (b) at a receiving end,
   receiving said packet via the communication network;
   temporarily storing the groups of data contained in the received packet; and
   sequentially reading out the temporarily stored groups of data and controlling sequential readout of the temporarily stored groups of data on the basis of the time information contained in the received packet, to allow the read-out groups of data to be reproduced with a period corresponding to said first period.

2. A data communication method comprising the steps of:
   (a) at a transmitting end,
   supplying a plurality of first groups of data arranged in a time series, each first group of data having a first period, said first period being a variable period;
   specifying one first group of data from each of a plurality of second groups of data, each second group comprising one or more first groups of data, and attaching to the specified first group of data time information indicative of a time position of the specified first group of data; and
   every predetermined second period longer than and asynchronous with said first period, transmitting one second group of data supplied within a given cycle of said second period and any attached time information, together as a packet, to a communication network, and
   (b) at a receiving end,
   receiving said packet via the communication network;
   temporarily storing the one or more first groups of data contained in the received packet; and
   sequentially reading out the temporarily stored one or more first groups of data and controlling sequential readout of the temporarily stored one or more first groups of data on the basis of the time information contained in the received packet, to allow the read-out one or more first groups of data to be reproduced with a period corresponding to said first period.

3. A data communication method comprising the steps of:
   supplying a plurality of first groups of data arranged in a time series, each first group of data having a first period, said first period being a variable period;
   specifying one first group of data every predetermined number of first groups of data, not smaller than two, and attaching to the specified first group of data time information indicative of a time position of the specified first group of data; and
   every predetermined second period longer than and asynchronous with said first period, transmitting, via a communication network, one second group of data, each second group of data comprising one or more first groups of data supplied within a given cycle of said second period, and any attached time information, together as a packet.

4. A system for communicating data between a transmitting-end unit and a receiving-end unit via a communication network,
   (a) said transmitting-end unit including:
   a supply section that supplies a plurality of groups of data arranged in a time series, each group of data having a first period, said first period being a variable period;
   a section that specifies one group of data every predetermined number of groups of data, not smaller than two, and attaches to the specified group of data time information indicative of a time position of the specified group of data; and
   a section that transmits the predetermined number of groups of data and any attached time information, together as a packet, to the communication network at a predetermined time in a predetermined second period asynchronous with said first period, and
   (b) said receiving-end unit including:
   a section that receives said packet via the communication network;
   a storage section that temporarily stores the groups of data contained in the received packet; and
   a section that sequentially reads out the temporarily stored groups of data and controls sequential readout of the temporarily stored groups of data on the basis of the time information contained in the received packet, to allow the read-out groups of data to be reproduced with a period corresponding to said first period.

5. A system for communicating data between a transmitting-end unit and a receiving-end unit via a communication network,
   (a) said transmitting-end unit including:
   a supply section supplying a plurality of first groups of data arranged in a time series, each first group of data having a first period, said first period being a variable period;
   a section that specifies one first group of data from each of a plurality of second groups of data, each second group comprising one or more first groups of data, and attaches to the specified first group of data time information indicative of a time position of the specified first group of data; and
   a section that, every predetermined second period longer than and asynchronous with said first period, transmits one second group of data supplied within a given cycle of said second period and any attached time information, together as a packet, to the communication network, and
   (b) said receiving-end unit including:
   a section that receives said packet via the communication network;
   a storage section that temporarily stores the one or more first groups of data contained in the received packet; and
   a section that sequentially reads out the temporarily stored one or more first groups of data and controls sequential readout of the temporarily stored one or more first groups of data on the basis of the time information contained in the received packet, to allow the read-out one or more first groups of data to be reproduced with a period corresponding to said first period.

6. A data communication system comprising:

a supply section that supplies a plurality of first groups of data arranged in a time series, each first group of data having a first period, said first period being a variable period;

a section that specifies one first group of data every predetermined number of first groups of data, not smaller than two, and attaches to the specified first group of data time information indicative of a time position of the specified first group of data; and a section that, every predetermined second period longer than and asynchronous with said first period, transmits, via a communication network, one second group of data, each second group of data comprising one or more first groups of data supplied within a given cycle of said second period, and any attached time information, together as a packet.

7. A machine-readable recording medium containing a group of instructions defining a data transmitting computer program, said data transmitting computer program comprising the steps of:

supplying a plurality of groups of data arranged in a time series, each group of data having a first period, said first period being a variable period;

specifying one group of data every predetermined number of groups of data, not smaller than two, and attaching to the specified group of data time information indicative of a time position of the specified group of data; and transmitting the predetermined number of groups of data and any attached time information, together as a packet, to a communication network at a predetermined time in a predetermined second period asynchronous with said first period.

8. A machine-readable recording medium containing a group of instructions defining a data transmitting computer program, said data transmitting computer program comprising the steps of:

supplying a plurality of first groups of data arranged in a time series, each first group of data having a first period, said first period being a variable period;

specifying one first group of data from each of a plurality of second groups of data, each second group comprising one or more first groups of data, and attaching to the specified first group of data time information indicative of a time position of the specified first group of data; and every predetermined second period longer than and asynchronous with said first period, transmitting one second group of data supplied within a given cycle of said second period and any attached time information, together as a packet, to a communication network.

9. A machine-readable recording medium containing a group of instructions defining a data transmitting computer program, said data transmitting computer program comprising the steps of:

supplying a plurality of first groups of data arranged in a time series, each first group of data having a first period, said first period being a variable period;

specifying one first group of data every predetermined number of first groups of data, not smaller than two, and attaching to the specified first group of data time information indicative of a time position of the specified first group of data; and every predetermined second period longer than and asynchronous with said first period, transmitting, via a communication network, one second group of data, each second group of data comprising one or more first groups of data supplied within a given cycle of said second period, and any attached time information, together as a packet.

10. A machine-readable recording medium containing a group of instructions defining a data receiving computer program for receiving a packet transmitted via a communication network, the packet comprised of a predetermined number of groups of data, not smaller than two, each group of data having a first period, said first period being a variable period, time information being attached to the packet to indicate a time position of at least a particular one of the predetermined number of groups of data contained in the packet, said computer program comprising the steps of:

receiving said packet via the communication network;

temporarily storing the groups of data contained in the received packet; and sequentially reading out the temporarily stored groups of data and controlling sequential readout of the temporarily stored groups of data on the basis of the time information contained in the received packet, to allow the read-out groups of data to be reproduced with a period corresponding to said first period.

11. A data transmitter device for generating a first timing signal with a predetermined period and sending data to be transmitted, having attached thereto a time stamp, to a communication network on the basis of a second timing signal generated in accordance with said first timing signal, characterized in that said time stamp is represented by data indicative of a relative time position within a given period of said first timing signal, said data transmitter device includes a buffer and writes said data to be transmitted into said buffer on the basis of said first timing signal, and said data transmitter device retrieves said data to be transmitted from said buffer on the basis of said second timing signal and then sends the retrieved data to said communication network.

12. A data receiver device for receiving data having attached thereto a time stamp represented by data indicative of a relative time position within a given period of a first timing signal having a predetermined period, transmitted to a communication network on the basis of a second timing signal generated in accordance with said first timing signal, characterized in that said data receiver device includes a buffer and writes the data received via the communication network into said buffer on the basis of said second timing signal, and said data receiver device retrieves the received data from said buffer on the basis of said first timing signal and reproduces the retrieved data on a time axis on the basis of said first timing signal and the time stamp attached to the retrieved data.

13. A data communication system comprising a data transmitter device and a data receiver device and where data communication on a communication network is controlled on the basis of a second timing signal generated in accordance with a first timing signal having a predetermined period, characterized in that said data transmitter device attaches a time stamp, represented by data indicative of a relative time position within a given period of said first timing signal, to data to be transmitted, writes said data with the time stamp into a first buffer on the basis of said first timing signal, and retrieves said data to be transmitted from said first buffer on the basis of said second timing signal and sends the retrieved data to the communication network, and said data receiver device receives and writes the data, sent by said data transmitter device to the communication network, into a second buffer on the basis of said second timing signal, then retrieves the data from said second buffer on the basis of said first timing signal and reproduces the retrieved data on a time axis on the basis of said first timing signal and the time stamp attached to the retrieved data.

14. A data communication method for communicating data between a data transmitting end and a data receiving end via a communication network, said data communication method comprising the steps of:

(a) at said data transmitting end,
attaching time stamp information, represented by data indicative of a relative time position within a given period of a first timing signal having a predetermined period, to data to be transmitted;
writing said data with the time stamp information into a first buffer on the basis of said first timing signal;
generating a second timing signal in accordance with said first timing signal; and
retrieving said data to be transmitted from said first buffer on the basis of said second timing signal and sending the retrieved data to the communication network, and b) at said data receiving end, receiving said data via the communication network and writing the
received data into a second buffer on the basis of said second timing signal;
retrieving the received data from said second buffer on the basis of a third timing signal having a same period as said first timing signal; and
reproducing the data, retrieved from said second buffer, on a time axis on the basis of said first timing signal and the time stamp information attached to the retrieved received data.

15. A machine-readable recording medium containing a group of instructions defining a data transmitting computer program, said data transmitting computer program comprising the steps of:
attaching time stamp information, represented by data indicative of a relative time position within a given period of a first timing signal having a predetermined period, to data to be transmitted;
writing said data with the time stamp information into a first buffer on the basis of said first timing signal;
generating a second timing signal in accordance with said first timing signal; and
retrieving said data from said first buffer on the basis of said second timing signal and sending the retrieved data to a communication network.

16. A recording medium readable by said machine as recited in claim 15 and containing a group of instructions defining a data receiving computer program, said data receiving computer program comprising the steps of:
receiving data via the communication network and writing the received data into a second buffer on the basis of said second timing signal;
retrieving the received data from said second buffer on the basis of a third timing signal having a same period as said first timing signal; and
reproducing the data, retrieved from said second buffer, on a time axis on the basis of said first timing signal and the time stamp information attached to the retrieved received data.

17. A data transfer system for use in a communication scheme where there are performed both isochronous communication that, using nominally-set cycles and bands reserved in corresponding relation to individual ones of the cycles, transmits data following transmission of a cycle start packet and asynchronous packet communication that transmits data using a remaining period of the cycle, a sum of a necessary period for the isochronous communication and a necessary period for the asynchronous packet communication being allowed to exceed the period of the cycle, characterized in that upon reception of the data having attached thereto a reproducing time stamp indicative of a specific data-reproducing time point, a delay time of the received data is detected on the basis of the cycle start packet which the received data belong to,
that a time value, obtained by adding one period time length of the cycle and the detected delay time to a time value of a start point of the cycle which the cycle start packet belongs to, is attached to the received data as a transferring time stamp, and
that when time represented by the transferring time stamp has arrived or lapsed, preparations are made for transferring the received data.

18. A data transfer system as recited in claim 17 wherein a bridge inserted in a communication network receives the data from a given segment, and wherein when time represented by the transferring time stamp has arrived or lapsed, said bridge transfers the received data to a wait buffer, and when a predetermined cycle start packet is sent out to another segment, said bridge transfers the received data from said wait buffer to a transmission buffer to transmit the data to the other segment.

19. A data transfer system as recited in claim 17 wherein said reproducing time stamp is indicative of a relative time position within the cycle,
wherein said reproducing time stamp is replaced with a new time stamp that is obtained by adding one period time length of the cycle to the time value of the start point of the cycle which the cycle start packet, preceding the received data, belongs to, and
wherein an operation for reproducing the received data is performed when time represented by the new time stamp has arrived or lapsed.

20. A machine-readable recording medium containing a group of instructions defining a data transferring computer program for use in a communication scheme where there are performed both isochronous communication that, using nominally-set cycles and bands reserved in corresponding relation to individual ones of the cycles, transmits data following transmission of a cycle start packet and asynchronous packet communication that transmits data using a remaining period of the cycle, a sum of a necessary period for the isochronous communication and a necessary period for the asynchronous packet communication being allowed to exceed the period of the cycle, said data transferring computer program comprising the steps of:
upon reception of the data having attached thereto a reproducing time stamp indicative of a specific data-reproducing time point, detecting a delay time of the received data on the basis of the cycle start packet which the received data belong to, attaching, to the received data, a time value that is obtained by adding one period time length of the cycle and the detected delay time to a time value of a start point of the cycle which the cycle start packet belongs to, as a transferring time stamp, and when time represented by the transferring time stamp has arrived or lapsed, making preparations for transferring the received data.

21. A method of synchronizing data of a plurality of channels to be transmitted to a communication network having a plurality of nodes connected thereto, characterized in that a plurality of the nodes, designated to transmit data to the communication network, attach a predetermined synchronizing data mark to the data of one or more of a predetermined plurality of channels and then send the data with the synchronizing data mark attached thereto to the communication network, and a predetermined one of the nodes, having received data via the communication network, sets, as to-be-synchronized channels, two or more of the predetermined plurality of channels that are to be synchronized with each other, determines whether the channel of the data received via the communication network corresponds to the to-be-synchronized channels, and synchronizes received data of two or more channels, having been determined as corresponding to the to-be-synchronized channels, by reference to the data marks attached to the received data.

22. A synchronization device for synchronizing data of a plurality of channels to be transmitted to a communication network having a plurality of nodes connected thereto, characterized in that a plurality of the nodes, designated to transmit data to the communication network, attach a predetermined synchronizing data mark to the data of one or more of a predetermined plurality of channels and then send the data with the synchronizing data mark attached thereto to the communication network, and a predetermined one of the nodes connected to the communication network includes said synchronization device, said synchronization device comprises:

means for setting, as to-be-synchronized channels, two or more of the predetermined plurality of channels that are to be synchronized with each other;

means for determining whether the channel of data received by the predetermined one node via the communication network corresponds to the to-be-synchronized channels; and means for synchronizing received data of two or more channels having been determined as corresponding to the to-be-synchronized channels, by reference to the data marks attached to the received data.

23. A synchronizing node for synchronizing data of a plurality of channels to be transmitted to a communication network having a plurality of nodes connected thereto, characterized in that said synchronizing node is connected to the communication network, a plurality of the nodes, designated to transmit data to the communication network, attach a predetermined synchronizing data mark to the data of one or more of a predetermined plurality of channels and then send the data with the synchronizing data mark attached thereto to the communication network, said synchronizing node comprises a reception section for receiving data via the communication network, a synchronization section for synchronizing data received by said reception section, and a transmission section for sending data to the communication network, said synchronization section comprises:

means for setting, as to-be-synchronized channels, two or more of the predetermined plurality of channels that are to be synchronized with each other;

means for determining whether the channel of the data received by the predetermined one node via the communication network corresponds to the to-be-synchronized channels; and means for synchronizing received data of two or more channels having been determined as corresponding to the to-be-synchronized channels, by reference to the data marks attached to the received data, and said transmission section transmits data of individual channels synchronized by said synchronization section.

24. A machine-readable recording medium containing a group of instructions defining a program for executing a method of synchronizing data of a plurality of channels to be transmitted to a communication network having a plurality of nodes connected thereto, said program comprising the steps of:

causing a plurality of the nodes, designated to transmit data to the communication network, attach a predetermined synchronizing data mark to the data of one or more of a predetermined plurality of channels and then send the data with the synchronizing data mark attached thereto to the communication network;

causing a predetermined one of the nodes, having received data via the communication network, to set, as to-be-synchronized channels, two or more of the predetermined plurality of channels that are to be synchronized with each other;

by causing the predetermined one node to determine whether the channel of the data received by the predetermined one node via the communication network corresponds to the to-be-synchronized channels; and causing the predetermined one node to synchronize received data of two or more channels having been determined as corresponding to the to-be-synchronized channels, by reference to the data marks attached to the received data.

25. A data transmitter device as recited in claim 11 wherein said buffer comprises a FIFO buffer.

26. A data receiver device as recited in claim 12 wherein said buffer comprises a FIFO buffer.

27. A data communication system as recited in claim wherein each of said first and second buffers comprises a FIFO buffer.

28. A data transmission method comprising the steps of:

supplying a plurality of groups of data arranged in a time series, each group of data having a first period, said first period being a variable period;

specifying one group of data every predetermined number of groups of data, not smaller than two, and attaching to the specified group of data time information indicative of a time position of the specified group of data; and transmitting the predetermined number of groups of data and any attached time information, together as a packet, to a communication network at a predetermined time in a predetermined second period asynchronous with said first period.

29. A data transmission apparatus comprising:
a supply section that supplies a plurality of groups of data arranged in a time series, each group of data having a first period, said first period being a variable period;
a processor adapted to specify one group of data every predetermined number of groups of data, not smaller than two, and attach to the specified group of data time information indicative of a time position of the specified group of data; and
a transmitter that transmits the predetermined number of groups of data and any attached time information, together as a packet, to a communication network at a predetermined time in a predetermined second period asynchronous with said first period.

30. A data transmission method comprising the steps of:
supplying a plurality of first groups of data arranged in a time series, each first group of data having a first period, said first period being a variable period;
specifying one first group of data from each of a plurality of second groups of data, each second group comprising one or more first groups of data, and attaching to the specified first group of data time information indicative of a time position of the specified first group of data; and
every predetermined second period longer than and asynchronous with said first period, transmitting one second group of data supplied within a given cycle of said second period and any attached time information, together as a packet, to a communication network.

31. A data transmission apparatus comprising:
a supply section that supplies a plurality of first groups of data arranged in a time series, each first group of data having a first period, said first period being a variable period;
a processor adapted to specify one first group of data from each of a plurality of second groups of data, each second group comprising one or more first groups of data, and attaching to the specified first group of data time information indicative of a time position of the specified first group of data; and
a transmitter that transmits, every predetermined second period longer than and asynchronous with said first period, one second group of data supplied within a given cycle of said second period and any attached time information, together as a packet, to a communication network.

32. A method of receiving a packet transmitted via a communication network,
the packet comprised of a predetermined number of groups of data, not smaller than two, each group of data having a first period, said first period being a variable period, time information being attached to the packet to indicate a time position of at least a particular one of the predetermined number of groups of data contained in the packet,
said method comprising the steps of:
receiving said packet via the communication network;
temporarily storing the groups of data contained in the received packet; and
sequentially reading out the temporarily stored groups of data, generating a period corresponding to the first period on the basis of the time information contained in the received packet, and controlling sequential readout of the temporarily stored groups of data to allow the read-out groups of data to be reproduced with the period corresponding to said first period.

33. An apparatus for receiving a predetermined number of groups of data, not smaller than two, transmitted via a communication network,
the predetermined number of groups of data transmitted via the communication network forming a packet, each group of data having a first period, said first period being a variable period, time information being attached to the packet to indicate a time position of at least a particular one of the predetermined number of groups of data contained in the packet,
said apparatus comprising:
a receiver that receives said packet via the communication network;
a storage section that temporarily stores the predetermined number of groups of data contained in the received packet; and
a processor adapted to sequentially read out the temporarily stored predetermined number of groups of data, generate a period corresponding to the first period on the basis of the time information contained in the received packet, and control sequential readout of the temporarily stored predetermined number of groups of data to allow the predetermined number of groups of data to be reproduced with the period corresponding to said first period.

34. A machine-readable recording medium containing a group of instructions defining a data receiving computer program for receiving one or more first groups of data transmitted via a communication network,
the one or more first groups of data transmitted via the communication network forming a packet, each first group of data having a first period, said first period being a variable period, time information being attached to the packet to indicate a time position of at least a particular one of the one or more first groups of data contained in the packet, said computer program comprising the steps of:
receiving said packet via the communication network;
temporarily storing the one or more first groups of data contained in the received packet; and
sequentially reading out the temporarily stored one or more first groups of data, generating a period corresponding to the first period on the basis of the time information contained in the received packet, and controlling sequential readout of the temporarily stored one or more first groups of data to allow the read-out one or more first groups of data to be reproduced with a period corresponding to said first period.

35. A method of receiving one or more first groups of data transmitted via a communication network,
the one or more first groups of data transmitted via the communication network forming a packet, each first group of data having a first period, said first period being a variable period, time information being attached to the packet to indicate a time position of at least a particular one of the one or more first groups of data contained in the packet, the packet being transmitted via the communication network every predetermined second period longer than and asynchronous with said first period,
said method comprising the steps of:
receiving said packet via the communication network;
temporarily storing the one or more first groups of data contained in the received packet; and
sequentially reading out the temporarily stored one or more first groups of data and controlling sequential readout of the temporarily stored one or more first groups of data on the basis of the time information contained in the received packet, to allow the read-out one or more first groups of data to be reproduced with a period corresponding to said first period.

36. An apparatus for receiving one or more first groups of data transmitted via a communication network, the one or more first groups of data transmitted via the communication network forming a packet, each first group of data having a first period, said first period being a variable period, time information being attached to the packet to indicate a time position of at least a particular one of the one or more first groups of data contained in the packet, the packet being transmitted via the communication network every predetermined second period longer than and asynchronous with said first period, said apparatus comprising:

a receiver that receives said packet via the communication network;

a storage section that temporarily stores the one or more first groups of data contained in the received packet; and a processor adapted to sequentially read out the temporarily stored one or more first groups of data and control sequential readout of the temporarily stored one or more first groups of data on the basis of the time information contained in the received packet, to allow the read-out one or more first groups of data to be reproduced with a period corresponding to said first period.

* * * * *